US010344188B2

(12) United States Patent
Janoski et al.

(10) Patent No.: US 10,344,188 B2
(45) Date of Patent: Jul. 9, 2019

(54) ACRYLIC POLYVINYL ACETAL FILMS COMPRISING AN ADHESIVE LAYER

(71) Applicant: 3M INNOVATIVE PROPERTIES COMPANY, St. Paul, MN (US)

(72) Inventors: Jonathan E. Janoski, Woodbury, MN (US); Carla S. Thomas, Woodbury, MN (US); Anthony F. Schultz, Forest Lake, MN (US); Tien Y. H. Whiting, St. Paul, MN (US); Kevin M. Lewandowski, Inver Grove Heights, MN (US); Duane D. Fansler, Dresser, WI (US); Keith R. Lyon, Hudson, WI (US); Arlin L. Weikel, Mansfield, PA (US); Eric D. Shockey, Stillwater, MN (US); Donald E. Gustafson, Lake Elmo, MN (US); John W. Frank, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/777,947

(22) PCT Filed: Dec. 16, 2016

(86) PCT No.: PCT/US2016/067122
§ 371 (c)(1),
(2) Date: May 22, 2018

(87) PCT Pub. No.: WO2017/112537
PCT Pub. Date: Jun. 29, 2017

(65) Prior Publication Data
US 2018/0346762 A1    Dec. 6, 2018

Related U.S. Application Data

(60) Provisional application No. 62/346,810, filed on Jun. 7, 2016, provisional application No. 62/270,752, filed on Dec. 22, 2015.

(51) Int. Cl.
*C09J 7/24* (2018.01)
*B32B 27/08* (2006.01)
(Continued)

(52) U.S. Cl.
CPC ................ *C09J 7/245* (2018.01); *B32B 3/26* (2013.01); *B32B 5/022* (2013.01); *B32B 5/024* (2013.01); *B32B 5/18* (2013.01); *B32B 7/06* (2013.01); *B32B 7/12* (2013.01); *B32B 15/082* (2013.01); *B32B 23/08* (2013.01); *B32B 23/20* (2013.01); *B32B 27/065* (2013.01); *B32B 27/08* (2013.01); *B32B 27/10* (2013.01); *B32B 27/12* (2013.01); *B32B 27/281* (2013.01); *B32B 27/304* (2013.01); *B32B 27/306* (2013.01); *B32B 27/308* (2013.01); *B32B 27/32* (2013.01); *B32B 27/34* (2013.01); *B32B 27/36* (2013.01); *B32B 27/365* (2013.01); *B32B 27/40* (2013.01); *B32B 27/42* (2013.01); *C09J 7/24* (2018.01); *C09J 7/29* (2018.01); *C09J 7/385* (2018.01); *C09J 7/405* (2018.01); *B32B 2250/02* (2013.01); *B32B 2250/03* (2013.01); *B32B 2250/24* (2013.01); *B32B 2255/02* (2013.01); *B32B 2255/06* (2013.01); *B32B 2255/10* (2013.01); *B32B 2255/12* (2013.01); *B32B 2255/20* (2013.01); *B32B 2255/205* (2013.01); *B32B 2262/0253* (2013.01); *B32B 2262/0261* (2013.01); *B32B 2262/04* (2013.01); *B32B 2262/062* (2013.01); *B32B 2262/101* (2013.01); *B32B 2262/105* (2013.01); *B32B 2307/41* (2013.01); *B32B 2307/412* (2013.01); *B32B 2307/416* (2013.01); *B32B 2307/54* (2013.01); *B32B 2307/542* (2013.01); *B32B 2307/748* (2013.01); *B32B 2405/00* (2013.01); (Continued)

(58) Field of Classification Search
CPC ...... C08J 5/18; C08J 2333/08; C08J 2429/14; B32B 27/304; B32B 27/08; B32B 27/308; B32B 27/306; B32B 27/00; B32B 27/30; B32B 2307/54; B32B 2307/31; B32B 2307/732; B32B 2307/546; B32B 2255/26; B32B 2255/10; B32B 2250/246
See application file for complete search history.

(56) References Cited

U.S. PATENT DOCUMENTS 2,736,721 A     2/1956   Dexter
RE24,906 E     12/1960   Ulrich
(Continued)

FOREIGN PATENT DOCUMENTS

CN     101817975     9/2010
CN     103342968    10/2013
(Continued)

OTHER PUBLICATIONS

"Nanodiamond dispersion for solvent based fluoropolymer coatings", Datasheet, 2016, Diamond Additive, 1 page.
(Continued)

*Primary Examiner* — Robert S Jones
(74) *Attorney, Agent, or Firm* — Carolyn A. Fischer

(57) ABSTRACT

A film is described comprising a (meth)acrylic polymer and polyvinyl acetal polymer composition. A layer of an adhesive composition is disposed proximate the film. The adhesive composition has a tensile elastic modulus of less than 1 MPa at 25° C. and 1 hertz.

21 Claims, No Drawings

(51) Int. Cl.

| | | |
|---|---|---|
| B32B 27/30 | (2006.01) | |
| C09J 7/29 | (2018.01) | |
| B32B 5/02 | (2006.01) | |
| B32B 5/18 | (2006.01) | |
| B32B 7/12 | (2006.01) | |
| B32B 15/082 | (2006.01) | |
| B32B 23/08 | (2006.01) | |
| B32B 23/20 | (2006.01) | |
| B32B 27/06 | (2006.01) | |
| B32B 27/10 | (2006.01) | |
| B32B 27/12 | (2006.01) | |
| B32B 27/28 | (2006.01) | |
| B32B 27/32 | (2006.01) | |
| B32B 27/34 | (2006.01) | |
| B32B 27/36 | (2006.01) | |
| B32B 27/40 | (2006.01) | |
| B32B 27/42 | (2006.01) | |
| B32B 3/26 | (2006.01) | |
| C09J 7/38 | (2018.01) | |
| C09J 7/40 | (2018.01) | |
| B32B 7/06 | (2019.01) | |

(52) U.S. Cl.
CPC ..... *B32B 2451/00* (2013.01); *C09J 2201/606* (2013.01); *C09J 2429/006* (2013.01); *C09J 2433/00* (2013.01); *C09J 2433/006* (2013.01)

(56) References Cited

U.S. PATENT DOCUMENTS

| | | | |
|---|---|---|---|
| 3,250,808 A | 5/1966 | Moore | |
| 3,277,091 A | 10/1966 | Schmelzer | |
| 3,591,531 A | 7/1971 | Schroeder | |
| 3,661,588 A | 5/1972 | Chang | |
| 3,691,140 A | 9/1972 | Silver | |
| 3,929,934 A | 12/1975 | Moore | |
| 4,000,356 A | 12/1976 | Weisgerber | |
| 4,181,752 A | 1/1980 | Martens | |
| 4,243,500 A | 1/1981 | Glennon | |
| 4,330,590 A | 5/1982 | Vesley | |
| 4,418,120 A | 11/1983 | Kealy | |
| 4,833,179 A | 5/1989 | Young | |
| 4,855,184 A | 8/1989 | Klun | |
| 4,894,259 A | 1/1990 | Kuller | |
| 4,968,562 A | 11/1990 | Delgado | |
| 4,994,322 A | 2/1991 | Delgado | |
| 5,102,731 A | 4/1992 | Takimoto | |
| 5,141,790 A | 8/1992 | Calhoun | |
| 5,209,971 A | 5/1993 | Babu | |
| 5,214,100 A | 5/1993 | Abele | |
| 5,296,277 A | 3/1994 | Wilson | |
| 5,362,516 A | 11/1994 | Wilson | |
| 5,461,134 A | 10/1995 | Leir | |
| 5,506,279 A | 4/1996 | Babu | |
| 5,623,010 A | 4/1997 | Groves | |
| 5,677,376 A | 10/1997 | Groves | |
| 5,820,957 A | 10/1998 | Schroeder | |
| 5,902,836 A | 5/1999 | Bennett | |
| 6,200,666 B1 | 3/2001 | Christian | |
| 6,319,985 B1 | 11/2001 | Bruning | |
| 6,423,381 B1 | 7/2002 | Colton | |
| 6,576,396 B1 | 6/2003 | Leichsenring | |
| 6,660,388 B2 | 12/2003 | Liu | |
| 6,664,020 B1 | 12/2003 | Warner | |
| 6,778,240 B2 | 8/2004 | Nakamura | |
| 6,806,320 B2 | 10/2004 | Everaerts | |
| 7,072,333 B2 | 7/2006 | Ahn | |
| 7,101,618 B2 | 9/2006 | Coggio | |
| 7,173,778 B2 | 2/2007 | Jing | |
| 7,385,020 B2 | 6/2008 | Anderson | |
| 7,473,462 B2 | 1/2009 | Coggio | |
| 7,718,264 B2 | 5/2010 | Klun | |
| 8,372,517 B2 | 2/2013 | Tokuchi | |
| 8,455,099 B2 | 6/2013 | Chevalier | |
| 8,568,849 B2 | 10/2013 | Shi | |
| 8,628,855 B2 | 1/2014 | Hao | |
| 8,634,146 B2 | 1/2014 | David | |
| 9,447,218 B2 | 9/2016 | Mikayama | |
| 2003/0111519 A1 | 6/2003 | Kinney | |
| 2003/0224150 A1 | 12/2003 | Ludwig | |
| 2004/0077775 A1 | 4/2004 | Audenaert | |
| 2004/0253534 A1 | 12/2004 | Kidnie | |
| 2005/0003222 A1 | 1/2005 | Everaerts | |
| 2005/0181943 A1 | 8/2005 | Kidnie | |
| 2007/0032587 A1 | 2/2007 | Nakashima | |
| 2009/0017313 A1 | 1/2009 | Outlaw | |
| 2009/0053448 A1 | 2/2009 | Paiva | |
| 2010/0015400 A1 | 1/2010 | Tokuchi | |
| 2010/0055418 A1 | 3/2010 | Takamatsu | |
| 2010/0058656 A1 | 3/2010 | Chevalier | |
| 2010/0154000 A1 | 6/2010 | Macrae | |
| 2011/0034618 A1 | 2/2011 | Register | |
| 2011/0076613 A1 | 3/2011 | Yoshida | |
| 2011/0112247 A1 | 5/2011 | Tokuchi | |
| 2011/0282000 A1 | 11/2011 | Hayes | |
| 2012/0003468 A1 | 1/2012 | Husemann | |
| 2012/0231269 A1 | 9/2012 | Nakagawa | |
| 2012/0260975 A1 | 10/2012 | Gerard | |
| 2012/0288692 A1 | 11/2012 | Broyles | |
| 2013/0004766 A1 | 1/2013 | Abe | |
| 2013/0310509 A1 | 11/2013 | Hannemann | |
| 2014/0030538 A1 | 1/2014 | Boutillier | |
| 2014/0154505 A1 | 6/2014 | Steelman | |
| 2015/0175458 A1 | 6/2015 | Momiyama | |
| 2015/0240067 A1 | 8/2015 | Nagai | |
| 2016/0289440 A1 | 10/2016 | Janoski | |
| 2016/0361905 A1* | 12/2016 | Yamaguchi ....... B32B 17/10036 |
| 2017/0362399 A1 | 12/2017 | Lipscomb | |

FOREIGN PATENT DOCUMENTS

| | | |
|---|---|---|
| CN | 103589320 | 2/2014 |
| DE | 102005023405 | 1/2007 |
| EP | 0411839 | 2/1991 |
| EP | 0447115 | 9/1991 |
| EP | 0570254 | 11/1993 |
| EP | 0570515 | 11/1993 |
| EP | 0617708 | 10/1994 |
| EP | 0659844 | 6/1995 |
| EP | 0710545 | 5/1996 |
| EP | 0783550 | 7/1997 |
| EP | 0997750 | 5/2000 |
| EP | 1038665 | 9/2000 |
| EP | 2080786 | 7/2009 |
| EP | 2163571 | 3/2010 |
| EP | 2284221 | 2/2011 |
| EP | 2623525 | 8/2013 |
| EP | 2937733 | 10/2015 |
| JP | S64-1737 | 1/1989 |
| JP | 09-324165 | 12/1997 |
| JP | 10-168271 | 6/1998 |
| JP | 10-292013 | 11/1998 |
| JP | 2000-247014 | 9/2000 |
| JP | 2003-040653 | 2/2003 |
| JP | 2004-331413 | 11/2004 |
| JP | 2005-015654 | 1/2005 |
| JP | 2005-054065 | 3/2005 |
| JP | 2007-023145 | 2/2007 |
| JP | 2007-277050 | 10/2007 |
| JP | 2008-055690 | 3/2008 |
| JP | 2008-106254 | 5/2008 |
| JP | 2009-102467 | 5/2009 |
| JP | 2010-083909 | 4/2010 |
| JP | 5255390 | 4/2010 |
| JP | 2011-012127 | 1/2011 |
| JP | 2014-005192 | 1/2014 |
| JP | 5610604 | 10/2014 |
| JP | 2014-224234 | 12/2014 |
| KR | 0148852 | 10/1998 |
| KR | 101289947 | 7/2013 |
| WO | WO 1995-013331 | 5/1995 |

(56) References Cited

FOREIGN PATENT DOCUMENTS

| WO | WO 1996-001687 | 1/1996 | |
| --- | --- | --- | --- |
| WO | WO 1998-015601 | 4/1998 | |
| WO | WO 1998-029516 | 7/1998 | |
| WO | WO 1999-003907 | 1/1999 | |
| WO | WO 2000-012574 | 3/2000 | |
| WO | WO 2003-012459 | 2/2003 | |
| WO | WO 2004-044019 | 5/2004 | |
| WO | WO 2005-023913 | 3/2005 | |
| WO | WO 2005-058594 | 6/2005 | |
| WO | WO 2006-094177 | 9/2006 | |
| WO | WO 2006-102383 | 9/2006 | |
| WO | WO 2009-029438 | 3/2009 | |
| WO | WO 2009-041017 | 4/2009 | |
| WO | WO 2009-146227 | 12/2009 | |
| WO | WO 2010-078071 | 7/2010 | |
| WO | WO 2010-078346 | 7/2010 | |
| WO | WO 2010-141345 | 12/2010 | |
| WO | WO 2011-042665 | 4/2011 | |
| WO | WO 2011-088096 | 7/2011 | |
| WO | WO 2011-094342 | 8/2011 | |
| WO | WO 2011-094350 | 8/2011 | |
| WO | WO 2012-069587 | 5/2012 | |
| WO | WO 2012-136941 | 10/2012 | |
| WO | WO 2013-019699 | 2/2013 | |
| WO | WO 2013-019706 | 2/2013 | |
| WO | WO 2013-019766 | 2/2013 | |
| WO | WO 2013-019772 | 2/2013 | |
| WO | WO 2014-050746 | 4/2014 | |
| WO | WO 2014-123766 | 8/2014 | |
| WO | WO 2014-156214 | 10/2014 | |
| WO | WO 2014-172185 | 10/2014 | |
| WO | WO 2014-179432 | 11/2014 | |
| WO | WO 2015-064219 | 5/2015 | |
| WO | WO-2015129758 A1 * | 9/2015 | ....... B32B 17/10036 |
| WO | WO 2015-157350 | 10/2015 | |
| WO | WO 2015-187770 | 12/2015 | |
| WO | WO 2016-094112 | 6/2016 | |
| WO | WO 2016-094277 | 6/2016 | |
| WO | WO 2016-094280 | 6/2016 | |
| WO | WO 2017-112453 | 6/2017 | |
| WO | WO 2017-112458 | 6/2017 | |
| WO | WO 2017-112468 | 6/2017 | |
| WO | WO 2017-112564 | 6/2017 | |
| WO | WO 2017-214007 | 12/2017 | |

OTHER PUBLICATIONS

Aran, "Tailoring the swelling and glass-transition temperature of acrylonitrile/hydroxyethyl acrylate copolymers", Journal of applied polymer science, 2010, vol. 116, pp. 628-635.
Butvar, "Polyvinyl butyral resin, properties and uses",pp. 1-32.
Carbodeon, "Carbodeon company presentation on nanodiamond additives to fluoropolymer coatings and composites", 20 pages.
Eastman, Product Data Sheet, "Tenite™Propionate 307E4000018 Clear, TRSP", 2000 [retrieved from the internet on May 25, 2017], URL <http://ws.eastman.com/ProductCatalogApps/PageControllers/ProdDatasheet_PC.aspx?Pro>, pp. 1-2.
Kse, "Introduction in properties and applications", Mowital, pp. 1-84.
Kse, "Polyvinyl butyral of superior quality", Mowital, pp. 1-36.
Kuraray, "Technical data sheet", Mowital, 2 pages.
Pocius, Adhesion and Adhesive Technology ,3rd Ed., 2012, pp. 287-291.
Rohm and Haas, "Pressure sensitive adhesives", 2006, pp. 1-2.
Sideridou-Karayannidou, "Synthesis and characterization of copolymers of N-vinylcarbazole and N,N-dimethylaminoethyl acrylate", Polymer, 1999, vol. 40,No. 17 , pp. 4915-4922.
Wakabayashi, "Studies on s—Triazines. I. Contrimerization of Trichloroacetonitrile With Other Nitriles," Bulletin of the Chemical Society of Japan, 1969, vol. 42, pp. 2924-2930.
International Search Report for PCT International Application No. PCT/US2016/067122, dated Apr. 5, 2017, 5 pages.

* cited by examiner

ACRYLIC POLYVINYL ACETAL FILMS COMPRISING AN ADHESIVE LAYER

CROSS REFERENCE TO RELATED APPLICATIONS

This application is a national stage filing under 35 U.S.C. 371 of PCT/US2016/067122, filed Dec. 16, 2016, which claims the benefit of U.S. Provisional Application No. 62/270,752 filed Dec. 22, 2015, and U.S. Provisional Application No. 62/346,810 filed Jun. 7, 2016, the disclosure of which is incorporated by reference in its/their entirety herein.

SUMMARY

A film is described comprising a (meth)acrylic polymer and polyvinyl acetal polymer composition comprising polymerized units having the following formula

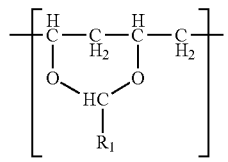

wherein $R_1$ is hydrogen or a C1-C7 alkyl group. A layer of an adhesive composition is disposed proximate the film. The adhesive composition has a tensile elastic modulus of less than 1 MPa at 25° C. and 1 hertz.

DETAILED DESCRIPTION

Presently described are films comprising a (meth)acrylic polymer and polyvinyl acetal polymer. A layer of an adhesive composition is disposed on the film. The film is preferably prepared by dissolving polyvinyl acetal polymer in a free-radically polymerizable solvent monomer. The solvent monomer is preferably polymerized by exposure to (e.g. ultraviolet) radiation.

The "Dahlquist Criterion for Tack" is widely recognized as a necessary condition of a pressure sensitive adhesives (PSA). It states that a PSA has a shear storage modulus (G') of less than $3\times10^6$ dyne/cm$^2$ (0.3 MPa) at approximately room temperature (25° C.) and a frequency of 1 Hertz (Pocius, Adhesion and Adhesive Technology 3$^{rd}$ Ed., 2012, p. 288).

A shear storage modulus can be converted to a tensile storage modulus using the following equation: E'=2G'(r+1), where r is Poisson's ratio for the relevant material. Using this equation and given that Poisson's ratio of elastomers and PSAs is close to 0.5, the Dahlquist Criterion expressed as a tensile storage modulus (E') is less than 0.9 MPa ($9\times10^6$ dyne/cm$^2$).

The film described herein generally has a tensile storage modulus (E') at 25° C. of greater than $9\times10^6$ dynes/cm$^2$ (0.9 MPa) or $1\times10^7$ dynes/cm$^2$ (1 MPa) at 1 hertz as can be measured by dynamic mechanical analysis (as determined by the test method described in the examples). The tensile storage modulus (E') at 25° C. and 1 Hertz is usually greater than $5\times10^7$ dynes/cm$^2$ (5 MPa), and in some embodiments at least $1\times10^8$ dynes/cm$^2$ (10 MPa), $5\times10^8$ dynes/cm$^2$ (50 MPa). In some embodiments, the tensile storage modulus (E') at 25° C. and 1 Hertz is at least $1\times10^9$ dynes/cm$^2$, $5\times10^9$ dynes/cm$^2$, or $1\times10^{10}$ dynes/cm$^2$ (i.e. 1000 MPa) at 1 Hertz.

Thus, the film is not a pressure sensitive adhesive in accordance with the Dahlquist criteria.

The adhesive layer has a tensile storage modulus (E') at 25° C. of less than $1\times10^7$ dynes/cm$^2$ (1 MPa) or less than $9\times10^6$ dynes/cm$^2$ (0.9 MPa).

The film may be characterized as a backing for an adhesive article such as a sheet or tape.

In some embodiments, the film described herein may be disposed upon or bonded (e.g. with an adhesive) to a second backing. The second backing may be disposed between the adhesive and the film comprising the (meth)acrylic polymer and polyvinyl acetal polymer and/or the second backing may be disposed on the opposite major surface or the film comprising a (meth)acrylic polymer and polyvinyl acetal polymer.

The second backing can comprise a variety of flexible and inflexible (e.g. preformed web) substrates including but not limited to polymeric films, woven or nonwoven fabrics, metal foils, foams, paper, and combinations thereof (e.g. metalized polymeric film). Polymeric films include for example polyolefins such as polypropylene (e.g. biaxially oriented), polyethylene (e.g. high density or low density), polyvinyl chloride, polyurethane, polyester (polyethylene terephthalate), polycarbonate, polymethyl(meth)acrylate (PMMA), polyvinylbutyral, polyimide, polyamide, fluoropolymer, cellulose acetate, cellulose triacetate, ethyl cellulose, as well as bio-based material such as polylactic acid (PLA). The woven or nonwoven fabric may comprise fibers or filaments of synthetic or natural materials such as cellulose (e.g. tissue), cotton, nylon, polyethylene, rayon, glass, ceramic materials, and the like.

In some embodiments, the second backing is a thermoplastic polymer such as polycarbonate, polyethylene terephthalate, polyamide, polyethylene, polypropylene, polystyren, polyvinyl chloride, poly(meth)acrylic polymers, ABS (acrylonitrile-butadiene-styrene copolymer) resins, and the like.

In some embodiments, the second backing is a transparent film having a transmission of visible light of at least 90 percent. In other embodiments, the second backing is opaque (e.g. white) or reflective.

In another embodiment, the film or second backing may further comprise a metal or metal oxide layer. Examples of metals include aluminum, silicon, magnesium, palladium, zinc, tin, nickel, silver, copper, gold, indium, stainless steel, chromium, titanium, and so on. Examples of metal oxides used in the metal oxide layer include aluminum oxide, zinc oxide, antimony oxide, indium oxide, calcium oxide, cadmium oxide, silver oxide, gold oxide, chromium oxide, silicon oxide, cobalt oxide, zirconium oxide, tin oxide, titanium oxide, iron oxide, copper oxide, nickel oxide, platinum oxide, palladium oxide, bismuth oxide, magnesium oxide, manganese oxide, molybdenum oxide, vanadium oxide, barium oxide, and so on. These metals and metal oxides may be used singly or in combination of two or more. Layers of these metals and/or metal oxides can be formed by known methods such as vacuum deposition, ion plating, sputtering, and CVD (Chemical Vapor Deposition). The thickness of the metal and/or metal oxide layer is typically at least 5 nm ranging up to 100 or 250 nm.

The thickness of the film or second backing is typically at least 10, 15, 20, or 25 microns (1 mil) and typically no greater than 500 microns (20 mil) thickness. In some embodiments, the thickness of the film or second backing is no greater than 400, 300, 200, or 100 microns. The film may have the same thickness as the second backing. However, the film, particularly when utilized in combination with a backing, may have a thickness of less than 10 microns. In some embodiments, the film comprising the (meth)acrylic polymer and polyvinyl acetal polymer is typically at least 250 nm, 500 nm, 750 nm or 1 micron. The overall film as well as the second backing is typically in the form of a roll-good, but may also be in the form of individual sheets.

In some embodiments, the film and/or second backing is conformable. By "conformable" it is meant that the film or film layer is sufficiently soft and flexible such that it accommodates curves, depressions, or projections on a substrate surface so that the film may be stretched around curves or projections, or may be pressed down into depressions without breaking or delaminating the film. It is also desirable that the film does not delaminate or release from the substrate surface after application (known as popping-up).

Suitable conformable second backings include, for example, polyvinyl chloride (PVC), plasticized polyvinyl chloride, polyurethane, polyethylene, polypropylene, fluoropolymer or the like. Other polymer blends are also potentially suitable, including for example thermoplastic polyurethane and a cellulose ester.

In some embodiments, the second backing has sufficient inelastic deformation after being stretched so that when stretched, the film does not recover to its original length. Preferably, the film has an inelastic deformation of at least 5% after being stretched once to 115% of their original length. In other embodiments, the conformability of the film comprising the (meth)acrylic polymer and polyvinyl acetal polymer, as determined by % tensile set (as described in WO2016/094277 is at least 20, 25, or 30%.

The film or second backing may optionally further comprise a primer or adhesion-promoting treatment disposed therebetween.

Examples of suitable primers include chlorinated polyolefins, polyamides, and modified polymers disclosed in U.S. Pat. Nos. 5,677,376, 5,623,010 and those disclosed in WO 98/15601 and WO 99/03907, and other modified acrylic polymers. The film and/or second backing may also be subjected to an adhesion-promoting treatment such as air or nitrogen corona treatment, plasma, flame, or actinic radiation.

The film may optionally comprise a structured layer as described in cofiled 77044US002 incorporated herein by reference. In some embodiments, the structured layer comprises a base film layer and structures disposed on a major surface of the base film layer, wherein the base film layer and/or structures may comprise the (meth)acrylic polymer and polyvinyl acetal polymer composition. In other embodiments, the structured layer comprises a base film layer, structures comprising peaks and valleys disposed on a major surface of the base film layer, and a filling material at least partially filling the valleys. In this embodiment, the base film layer, and/or the structures, and/or the filling material comprise the (meth)acrylic polymer and polyvinyl acetal polymer composition.

The film comprises polymerized units of one or more (meth)acrylate ester monomers derived from a (e.g. nontertiary) alcohol containing 1 to 14 carbon atoms and preferably an average of 4 to 12 carbon atoms Examples of monomers include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol; 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, and the like.

The film comprises polymerized units of one or more low Tg (meth)acrylate monomers, i.e. a (meth)acrylate monomer when reacted to form a homopolymer has a $T_g$ no greater than 0° C. In some embodiments, the low Tg monomer has a $T_g$ no greater than −5° C., or no greater than −10° C. The Tg of these homopolymers is often greater than or equal to −80° C., greater than or equal to −70° C., greater than or equal to −60° C., or greater than or equal to −50° C.

The low Tg monomer may have the formula

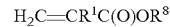

wherein $R^1$ is H or methyl and $R^8$ is an alkyl with 1 to 22 carbons or a heteroalkyl with 2 to 20 carbons and 1 to 6 heteroatoms selected from oxygen or sulfur. The alkyl or heteroalkyl group can be linear, branched, cyclic, or a combination thereof.

Exemplary low Tg monomers include for example ethyl acrylate, n-propyl acrylate, n-butyl acrylate, isobutyl acrylate, t-butyl acrylate, n-pentyl acrylate, isoamyl acrylate, n-hexyl acrylate, 2-methylbutyl acrylate, 2-ethylhexyl acrylate, 4-methyl-2-pentyl acrylate, n-octyl acrylate, 2-octyl acrylate, isooctyl acrylate, isononyl acrylate, decyl acrylate, isodecyl acrylate, lauryl acrylate, isotridecyl acrylate, octadecyl acrylate, and dodecyl acrylate.

Low Tg heteroalkyl acrylate monomers include, but are not limited to, 2-methoxyethyl acrylate and 2-ethoxyethyl acrylate.

In some embodiments, the film comprises polymerized units of at least one low Tg monomer(s) having an alkyl group with 6 to 20 carbon atoms. In some embodiments, the low Tg monomer has an alkyl group with 7 or 8 carbon atoms. Exemplary monomers include, but are not limited to, 2-ethylhexyl (meth)acrylate, isooctyl (meth)acrylate, n-octyl (meth)acrylate, 2-octyl (meth)acrylate, isodecyl (meth)acrylate, and lauryl (meth)acrylate. In some embodiments, the monomer is an ester of (meth)acrylic acid with an alcohol derived from a renewable source, such as 2-octyl (meth)acrylate.

The film typically comprises at least 10, 15, 20 or 25 wt.-% of polymerized units of monofunctional alkyl (meth)acrylate low Tg monomer (e.g. having a Tg of less than 0° C.), based on the total weight of the polymerized units (i.e. excluding inorganic filler or other additives). As used herein, wt.-% of polymerized units refers to the wt.-% based on the total weight of the (meth)acrylic polymer, polyvinyl acetal (e.g. butyral) polymer, and crosslinker when present. The film typically comprises no greater than 60, 55, 50, 45, or 40 wt.-% of polymerized units of monofunctional alkyl (meth)acrylate monomer having a Tg of less than 0° C., based on the total weight of the polymerized units.

In other embodiments, the film comprises less than 10 wt.-% of polymerized units of monofunctional alkyl (meth)acrylate monomer having a Tg of less than 0° C. based on the total weight of the polymerized units of the (meth)acrylic polymer, polyvinyl acetal (e.g. butyral) polymer, and crosslinker when present. For example, the minimum concentration of polymerized units of monofunctional alkyl (meth)acrylate monomer having a Tg of less than 0° C. may be 0.5, 1, 2, 3, 4, 5, 6, 7, 8, or 9 wt.-%.

When the film is free of unpolymerized components such as inorganic filler and additives, the wt.-% of specified polymerized units is approximately the same as the wt.-% of such polymerized units present in the total film composition. However, when the film composition comprises unpolymerized components, such as inorganic filler or other unpolymerizable additive the total film composition can comprise substantially less polymerized units. In general, the total amount of unpolymerizable additives may range up to 25 wt.-%. Thus, in the case of films comprising such unpolymerizable additives the concentration of specified polymerized units can be as much as 5, 10, 15, 20, 25 wt.-% less, depending on the total concentration of such additives. For example, when the film comprises 20 wt.-% inorganic filler, the concentration of low Tg monofunctional alkyl (meth)acrylate monomer may be 20% less, i.e. at least 8 wt.-%, 12 wt.-% etc.

The film generally comprises at least one (e.g. non-polar) high Tg monomer, i.e. a (meth)acrylate monomer when reacted to form a homopolymer has a Tg greater than 0° C. The high Tg monomer more typically has a Tg greater than 5° C., 10° C., 15° C., 20° C., 25° C., 30° C., 35° C., or 40° C.

In typical embodiments, the film comprises at least one high Tg monofunctional alkyl (meth)acrylate monomers including for example, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, norbornyl (meth)acrylate, benzyl methacrylate, 3,3,5 trimethylcyclohexyl acrylate, cyclohexyl acrylate, and propyl methacrylate or combinations.

In some embodiments, the film comprises at least 1, 2, or 3 wt.-% up to 35 or 40 wt.-% of polymerized units of a monofunctional alkyl (meth)acrylate monomer having a Tg greater than 40° C., 50° C., 60° C., 70° C., or 80° C. based on the total weight of the polymerized units (i.e. excluding inorganic filler or other additives). In some embodiments, the film comprises no greater than 30, 25, 20, or 10 wt.-% of polymerized units of high Tg monofunctional alkyl (meth)acrylate monomer. Further, in some embodiments, the film comprises less than 1.0, 0.5, 0.1 wt.-% or is free of polymerized units of high Tg monofunctional alkyl (meth)acrylate monomer.

In other embodiments, the film, comprises greater than 40 wt.-% of polymerized units of a monofunctional alkyl (meth)acrylate monomer having a Tg greater than 40° C. based on the total weight of the polymerized units of the (meth)acrylic polymer, polyvinyl acetal (e.g. butyral) polymer, and crosslinker when present. For example, the maximum concentration of polymerized units of a monofunctional alkyl (meth)acrylate monomer having a Tg greater than 40° C. may be 50, 60, 70, 80, or 90 wt.-%.

The Tg of the homopolymer of various monomers is known and is reported in various handbooks. The Tg of some illustrative monomers is also reported in PCT Application No. WO2016/094277; incorporated herein by reference In typical embodiments, the film further comprises at least 10, 15 or 20 wt.-% and no greater than 65 wt.-% of polymerized units of polar monomers. Such polar monomers generally aids in compatibilizing the polyvinyl acetal (e.g. butyral) polymer with the high and low Tg alkyl (meth)acrylate (e.g. solvent) monomers. The polar monomers typically have a Tg greater than 0° C., yet the Tg may be less than the high Tg monofunctional alkyl (meth)acrylate monomer.

Representative polar monomers include for example acid-functional monomers, hydroxyl functional monomers, nitrogen-containing monomers, and combinations thereof.

In some embodiments, the film comprises polymerized units of an acid functional monomer (a subset of high Tg monomers), where the acid functional group may be an acid per se, such as a carboxylic acid, or a portion may be salt thereof, such as an alkali metal carboxylate.

Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid, and mixtures thereof.

In some embodiments, the film comprises 0.5 up to 20 or 25 wt.-% of polymerized units of acid functional monomers, such as acrylic acid. In some embodiments, the film composition comprises at least 1, 2, 3, 4, or 5 wt.-% of polymerized units of acid-functional monomers. In other embodiments, the film composition comprises less than 1.0, 0.5, 0.1 wt.-% or is free of polymerized units of acid-functional monomers.

In some embodiments, the film comprises non-acid-functional polar monomer.

One class of non-acid-functional polar monomers includes nitrogen-containing monomers. Representative examples include N-vinylpyrrolidone; N-vinylcaprolactam; acrylamide; mono- or di-N-alkyl substituted acrylamide; t-butyl acrylamide; dimethylaminoethyl acrylamide; and N-octyl acrylamide. In some embodiments, the film comprises at least 0.5, 1, 2, 3, 4, or 5 wt.-% of polymerized units of nitrogen-containing monomers and typically no greater than 25 or 30 wt.-%. In other embodiments, film comprises less than 1.0, 0.5, 0.1 wt.-% or is free of polymerized units of nitrogen-containing monomers.

Another class of non-acid-functional polar monomers includes alkoxy-functional (meth)acrylate monomers. Representative examples 2-(2-ethoxyethoxy)ethyl (meth)acrylate, 2-ethoxyethyl (meth)acrylate, 2-hydroxyethyl (meth)acrylate, 2-(methoxyethoxy)ethyl, 2-methoxyethyl methacrylate, and polyethylene glycol mono(meth)acrylates.

In some embodiments, the film comprises at least 0.5, 1, 2, 3, 4, or 5 wt.-% of polymerized units of alkoxy-functional (meth)acrylate monomers and typically no greater than 30 or 35 wt.-%. In other embodiments, the film comprises less than 1.0, 0.5, 0.1 wt.-% or is free of polymerized units of alkoxy-functional (meth)acrylate monomers.

Preferred polar monomers include acrylic acid, 2-hydroxyethyl (meth)acrylate; N,N-dimethyl acrylamide and N-vinylpyrrolidinone. The film generally comprises polymerized units of polar monomer in an amount of at least 10, 15 or 20 wt.-% and typically no greater than 65, 60, 55, 50 or 45 wt.-%.

The film may optionally comprise vinyl monomers including vinyl esters (e.g., vinyl acetate and vinyl propionate), styrene, substituted styrene (e.g., α-methyl styrene), vinyl halide, and mixtures thereof. As used herein vinyl monomers are exclusive of polar monomers. In some embodiments, the film comprises at least 0.5, 1, 2, 3, 4, or 5 wt.-% and typically no greater than 10 wt.-% of polymerized units of vinyl monomers. In other embodiments, the film comprises less than 1.0, 0.5, 0.1 wt.-% or is free of polymerized units of vinyl monomers.

In some favored embodiments, the polymerized units of the (meth)acrylic polymer contain aliphatic groups and lack aromatic moieties.

In typical embodiments, the (e.g. solvent) monomer(s) are polymerized to form a random (meth)acrylic polymer copolymer.

The polyvinyl acetal polymer utilized in the present invention is obtained, for example, by reacting polyvinyl alcohol with aldehyde, as known in the art and described in greater detail in previously cited WO2016/094277. The polyacetal resin is typically a random copolymer. However, block copolymers and tapered block copolymers may provide similar benefits as random copolymers.

The content of polyvinyl acetal (e.g. butyral) typically ranges from 65 wt.-% up to 90 wt.-% of the polyvinyl acetal (e.g. butyral) polymer. In some embodiments, the content of polyvinyl acetal (e.g. butyral) ranges from about 70 or 75 up to 80 or 85 wt.-%. The content of polyvinyl alcohol typically ranges from about 10 to 30 wt.-% of the polyvinyl acetal (e.g. butyral) polymer.

In some embodiments, the content of polyvinyl alcohol of the polyvinyl acetal (e.g. butyral) polymer ranges from about 15 to 25 wt.-%. The content of polyvinyl acetate of the polyvinyl acetal (e.g. butyral) polymer can be zero or range from 1 to 8 wt.-% of the polyvinyl acetal (e.g. butyral) polymer. In some embodiments, the content of polyvinyl acetate ranges from about 1 to 5 wt.-%. In some embodiments, the alkyl residue of aldehyde comprises 1 to 7 carbon atoms. In other embodiments, the alkyl reside of the aldehyde comprises 3 to 7 carbon atoms such as in the case of butylaldehyde ($R_1=3$), hexylaldehyde ($R_1=5$), n-octylaldehyde ($R_1=7$). Of these butylaldehyde, also known as butanal is most commonly utilized. Polyvinyl butyral ("PVB") polymer is commercially available from Kuraray under the trade designation "Mowital™" and Solutia under the trade designation "Butvar™".

In some embodiments, the polyvinyl acetal (e.g. butyral) polymer has a Tg ranging from about 60° C. up to about 75° C. or 80° C. In some embodiments, the Tg of the polyvinyl acetal (e.g. butyral) polymer is at least 65 or 70° C. When other aldehydes, such as n-octyl aldehyde, are used in the preparation of the polyvinyl acetal polymer, the Tg may be less than 65° C. or 60° C. The Tg of the polyvinyl acetal polymer is typically at least 35, 40 or 45° C. When the polyvinyl acetal polymer has a Tg of less than 60° C., higher concentrations of high Tg monomers may be employed in the film composition in comparison to those utilizing polyvinyl butyral polymer. When other aldehydes, such as acetaldehyde, are used in the preparation of the polyvinyl acetal polymer, the Tg may be greater than 75° C. or 80° C. When the polyvinyl acetal polymer has a Tg of greater than 70° C., higher concentrations of low Tg monomers may be employed in the film composition in comparison to those utilizing polyvinyl butyral polymer.

In some embodiments, the polyvinyl acetal (e.g. PVB) polymer typically has an average molecular weight (Mw) of at least 10,000 g/mole or 15,000 g/mole and no greater than 150,000 g/mole or 100,000 g/mole. In some favored embodiments, the polyacetal (e.g. PVB) polymer has an average molecular weight (Mw) of at least 20,000 g/mole; 25,000; 30,000, 35,000 g/mole and typically no greater than 75,000 g/mole.

In some embodiments, the film comprises 5 to 30 wt.-% of polyvinyl acetal polymer such as polyvinyl butyral based on the total weight of the polymerized units of the (meth) acrylate polymer, polyvinyl acetal (e.g. butyral) polymer, and crosslinker when present. In some embodiments, the film comprises at least 10, 11, 12, 13, 14, or 15 wt.-% of polyvinyl acetal (e.g. PVB) polymer. In some embodiments, the film comprises no greater than 25 or 20 wt.-% of polyvinyl acetal (e.g. PVB) polymer. When the film comprises a polyvinyl acetal (e.g. PVB) polymer having an average molecular weight (Mw) less than 50,000 g/mole, the film may comprise higher concentration polyvinyl acetal (e.g. PVB) polymer such as 35 or 40 wt.-%. Thus, the film and composition comprises a minor amount of polyvinyl acetal (e.g. PVB) resin in combination with a major amount of (meth)acrylic polymer. The amount of (meth)acrylic polymer is typically at least 50, 55, 60, 65, 70, 75, 80, 85, 90, or 95 wt.-% of the film.

In other embodiments, the film comprises less than 5 wt.-% of polyvinyl acetal (e.g. butyral) polymer based on the total weight of the polymerized units of the (meth)acrylic polymer, polyvinyl acetal (e.g. butyral) polymer, and crosslinker when present. For example, the minimum concentration of polyvinyl acetal (e.g. butyral) polymer may be 0.5, 1, 1.5, 2, 1.5, 3, 3.5, 4, or 4.5 wt.-%

In some embodiments, the film comprises polymerized crosslinker units. In some embodiments, the crosslinker is a multifunctional crosslinker capable of crosslinking polymerized units of the (meth)acrylic polymer such as in the case of crosslinkers comprising functional groups selected from (meth)acrylate, vinyl, and alkenyl (e.g. C3-C20 olefin groups); as well as chlorinated triazine crosslinking compounds.

Examples of useful (e.g. aliphatic) multifunctional (meth) acrylate include, but are not limited to, di(meth)acrylates, tri(meth)acrylates, and tetra(meth)acrylates, such as 1,6-hexanediol di(meth)acrylate, poly(ethylene glycol) di(meth) acrylates, polybutadiene di(meth)acrylate, polyurethane di(meth)acrylates, and propoxylated glycerin tri(meth)acrylate, and mixtures thereof.

In one embodiment, the crosslinking monomer comprises a (meth)acrylate group and an olefin group. The olefin group comprises at least one hydrocarbon unsaturation. The crosslinking monomer may have the formula

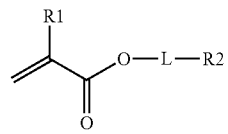

R1 is H or $CH_3$,
L is an optional linking group; and
R2 is an olefin group, the olefin group being optionally substituted.

Dihydrocyclopentadienyl acrylate is one example of this class of crosslinking monomer. Other crosslinking monomers of this type comprising a C6-C20 olefin are described in WO2014/172185.

In other embodiments, the crosslinking monomer comprises at least two terminal groups selected from allyl, methallyl, or combinations thereof. An allyl group has the structural formula $H_2C=CH-CH_2-$. It consists of a methylene bridge ($-CH_2-$) attached to a vinyl group ($-CH=CH_2$). Similarly, a methallyl group is a substituent with the structural formula $H_2C=C(CH_3)-CH_2-$. The terminology (meth)allyl includes both allyl and methallyl groups. Crosslinking monomers of this types are described in PCT Publication WO2015/157350.

In some embodiments, the film may comprise a multifunctional crosslinker comprising vinyl groups, such as in the case of 1,3-divinyl tetramethyl disiloxane.

The triazine crosslinking compound may have the formula.

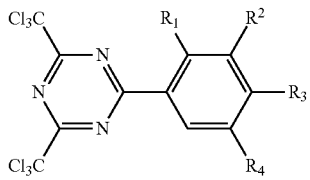

wherein $R_1$, $R_2$, $R_3$ and $R_4$ of this triazine crosslinking agent are independently hydrogen or alkoxy group, and 1 to 3 of $R_1$, $R_2$, $R_3$ and $R_4$ are hydrogen. The alkoxy groups typically have no greater than 12 carbon atoms. In favored embodiments, the alkoxy groups are independently methoxy or ethoxy. One representative species is 2,4,-bis(trichloromethyl)-6-(3,4-bis(methoxy)phenyl)-triazine. Such triazine crosslinking compounds are further described in U.S. Pat. No. 4,330,590.

In other embodiments, the crosslinker comprises hydroxyl-reactive groups, such as isocyanate groups, capable of crosslinking alkoxy group of the (meth)acrylic polymer (e.g. HEA) or polyvinyl alcohol groups of the polyvinyl acetal (PVB). Examples of useful (e.g. aliphatic) multifunctional isocyanate crosslinkers include hexamethylene diisocyanate, isophorone diisocyanate, as well as derivatives and prepolymers thereof.

Various combinations of two or more of crosslinkers may be employed.

When present, the crosslinker is typically present in an amount of at least 0.5, 1.0, 1.5, or 2 wt.-% ranging up to 5 or 10 wt.-% based on the total weight of the polymerized units of the (meth)acrylate polymer, polyvinyl acetal (e.g. butyral) polymer, and crosslinker. Thus, the film comprises such amount of polymerized crosslinker units.

In other embodiments, the film comprises greater than 10 wt.-% of polymerized crosslinker units based on the total weight of the polymerized units of the (meth)acrylic polymer, polyvinyl acetal (e.g. butyral) polymer, and crosslinker when present. For example, the maximum concentration of polymerized crosslinker units may range up to 50, 55, 60, 65, 70, 75 or 80 wt.-%.

The film can be polymerized by various techniques, yet is preferably polymerized by solventless radiation polymerization, including processes using electron beam, gamma, and especially ultraviolet light radiation. In this (e.g. ultraviolet light radiation) embodiment, generally little or no methacrylate monomers are utilized. Thus, the film comprises zero or no greater than 10, 9, 8, 7, 6, 5, 4, 3, 2, or 1 wt.-% of polymerized units of monomer having a methacrylate group. One method of preparing the film described herein comprises dissolving the polyvinyl acetal (e.g. PVB) polymer in the unpolymerized solvent monomer(s) of the (meth)acrylic polymer forming a coatable composition of sufficient viscosity.

Another method includes partially polymerizing the solvent monomer(s) to produce a syrup composition comprising a solute (meth)acrylic polymer dissolved in unpolymerized solvent monomer(s).

The polyvinyl acetal (e.g. PVB) polymer can be added prior to and/or after partial polymerization of monomer(s) of the (meth)acrylic polymer. In this embodiment, the coatable composition comprises partially polymerized (e.g. alkyl (meth)acrylate) solvent monomers and polyvinyl acetal (e.g. PVB) polymer. The coatable composition is then coated on a suitable substrate and further polymerized.

The viscosity of the coatable composition is typically at least 1,000 or 2,000 cps ranging up to 100,000 cps at 25° C. In some embodiments, the viscosity is no greater than 75,000; 50,000, or 25,000 cps. The coatable composition is coated on a suitable substrate such as a release liner, and polymerized by exposure to radiation.

The method can form a higher molecular weight (meth) acrylic polymer than can be used by solvent blending a prepolymerized (meth)acrylic polymer and polyvinyl acetal (e.g. PVB) polymer. Higher molecular weight (meth)acrylic polymer can increase the amount of chain entanglements, thus increasing cohesive strength. Also, the distance between crosslinks can be greater with a high molecular (meth)acrylic polymer, which allows for increased wet-out onto a surface of an adjacent (e.g. film) layer.

The molecular weight of the film composition can be increased even further by the inclusion of crosslinker.

The high molecular weight (meth)acrylic polymer as well as the film typically has a gel content (as measured according to the Gel Content Test Method described in the examples utilizing tetrahydrofuran (THF) of at least 20, 25 30, 35, or 40%. In some embodiments, the gel content is at least 45, 50, 55, 60, 65, 70, 75, 80, 85, 90, or 95%. The gel content is typically less than 100%, 99%, or 98%. When the (meth)acrylic polymer has a high gel content, it is typically not thermoplastic.

The polymerization is preferably conducted in the absence of unpolymerizable organic solvents such as ethyl acetate, toluene and tetrahydrofuran, which are non-reactive with the functional groups of the solvent monomer and polyvinyl (e.g. PVB) acetal. Solvents influence the rate of incorporation of different monomers in the polymer chain and generally lead to lower molecular weights as the polymers gel or precipitate from solution. Thus, the film composition can be free of unpolymerizable organic solvent.

Useful photoinitiators include benzoin ethers such as benzoin methyl ether and benzoin isopropyl ether; substituted acetophenones such as 2,2-dimethoxy-2-phenylacetophenone photoinitiator, available the trade name IRGACURE 651 or ESACURE KB-1 photoinitiator (Sartomer Co., West Chester, Pa.), and dimethylhydroxyacetophenone; substituted α-ketols such as 2-methyl-2-hydroxy propiophenone; aromatic sulfonyl chlorides such as 2-naphthalenesulfonyl chloride; photoactive oximes such as 1-phenyl-1, 2-propanedione-2-(O-ethoxy-carbonyl)oxime; mono- or bis-acrylphosphine oxides such as IRGANOX 819 or LUCIRIN TPO.

Preferred photoinitiators are photoactive compounds that undergo a Norrish I cleavage to generate free radicals that can initiate by addition to the acrylic double bonds. The photoinitiator can be added to the mixture to be coated after the polymer (e.g. syrup) has been formed, i.e., photoinitiator can be added. Such polymerizable photoinitiators are described, for example, in U.S. Pat. Nos. 5,902,836 and 5,506,279 (Gaddam et al.).

Such photoinitiators are typically present in an amount of from 0.1 to 1.0 wt.-%. Relatively thick coatings can be achieved when the extinction coefficient of the photoinitiator is low.

The film composition can be coated on an unstructured or structured release liner using conventional coating techniques. For example, these film compositions can be applied by methods such as roller coating, flow coating, dip coating, spin coating, spray coating knife coating, and die coating. Coating thicknesses may vary. The film composition may be of any desirable concentration for subsequent coating, but is typically 5 to 30, 35 or 40 wt.-% polyvinyl acetal polymer solids in (meth)acrylic solvent monomer. The desired concentration may be achieved by further dilution of the coatable composition. The coating thickness may vary depending on the desired thickness of the (e.g. radiation) cured film.

The coated release liner may be brought in contact with the film or second backing, as previously described, prior to curing.

The film composition and the photoinitiator may be irradiated with activating UV radiation having a UVA maximum at a wavelength range of 280 to 425 nanometers to polymerize the monomer component(s). UV light sources can be of various types. Low light intensity sources, such as blacklights, generally provide intensities ranging from 0.1 or 0.5 mW/cm$^2$ (millwatts per square centimeter) to 10 mW/cm$^2$ (as measured in accordance with procedures approved by the United States National Institute of Standards and Technology as, for example, with a UVIMAP UM 365 L-S radiometer manufactured by Electronic Instrumentation & Technology, Inc., in Sterling, Va.). High light intensity sources generally provide intensities greater than 10, 15, or 20 mW/cm$^2$ ranging up to 450 mW/cm$^2$ or greater. In some embodiments, high intensity light sources provide intensities up to 500, 600, 700, 800, 900 or 1000 mW/cm$^2$. UV light to polymerize the monomer component(s) can be provided by various light sources such as light emitting diodes (LEDs), blacklights, medium pressure mercury lamps, etc. or a combination thereof. The monomer component(s) can also be polymerized with higher intensity light sources as available from Fusion UV Systems Inc. The UV exposure time for polymerization and curing can vary depending on the intensity of the light source(s) used. For example, complete curing with a low intensity light course can be accomplished with an exposure time ranging from about 30 to 300 seconds; whereas complete curing with a high intensity light source can be accomplished with shorter exposure time ranging from about 5 to 20 seconds. Partial curing with a high intensity light source can typically be accomplished with exposure times ranging from about 2 seconds to about 5 or 10 seconds.

In some embodiments, the first film layer is transparent having a transmission of visible light of at least 90 percent. In some embodiments, the film, film layer, as well as the composition of (meth)acrylic polymer, polyvinyl acetal (e.g. butyral), and crosslinker when present is transparent having a transmission of visible light of at least 90, 91, 92, 93, 94, or 95% as measured according to the test method described in the examples. In some embodiments, the clarity is at least 90, 91, 92, 93, 94, or 95%. The transmission and clarity are typically less than 100%. In some embodiments, the haze is less than 15% or 10%. In some embodiments, the haze is less than 9, 8, 7, 6, 5, 4, 3, or 2%. The haze may be at least 0.5%.

In other embodiments, the first film layer is opaque (e.g. white) or reflective.

The film may optionally contain one or more conventional additives. Additives include, for example, antioxidants, stabilizers, ultraviolet absorbers, lubricants, processing aids, antistatic agents, colorants, impact resistance aids, fillers, matting agents, flame retardants (e.g. zinc borate) and the like. Some examples of fillers or pigments include inorganic oxide materials such as zinc oxide, titanium dioxide, silica, carbon black, calcium carbonate, antimony trioxide, metal powders, mica, graphite, talc, ceramic microspheres, glass or polymeric beads or bubbles, fibers, starch and the like.

When present, the amount of additive can be at least 0.1, 0.2, 0.3, 0.4, or 0.5 wt.-%. In some embodiments, the amount of additive is no greater than 25, 20, 15, 10 or 5 wt.-% of the total film composition. In other embodiments, the concentration of additive can range up to 40, 45, 50, 55 or about 65 wt.-% of the total film composition.

In some embodiments, the film is free of plasticizer, tackifier and combinations thereof. In other embodiments, the film composition comprise plasticizer, tackifier and combinations thereof in amount no greater than 5, 4, 3, 2, or 1 wt.-% of the total film composition. From the standpoint of tensile strength, it is preferable not to add a large amount of tackifier or plasticizer.

In some embodiments, the film composition comprises fumed silica. The concentration of (e.g. fumed) silica can vary. In some embodiments, the film comprises at least 0.5 or 1.0 wt.-% of (e.g. fumed) silica.

The film can be characterized using various techniques. Although the Tg of a copolymer may be estimated by use of the Fox equation, based on the Tgs of the constituent monomers and the weight percent thereof, the Fox equation does not take into effect interactions, such as incompatibility, that can cause the Tg to deviate from the calculated Tg. The Tg of the film refers to the midpoint Tg as measured by Differential Scanning calorimetry, (DSC), according to the test method previously cited in PCT Application No. WO2016/094277. When the film and (e.g. radiation) cured composition comprises a monomer having a Tg greater than 150° C., the upper limit of the DSC testing temperature is chosen to be higher than that of the highest Tg monomer. The midpoint Tg as measured by DSC is 10-12° C. lower than the peak temperature Tg as measured by Dynamic Mechanical Analysis (DMA) at a frequency of 10 Hz and a rate of 3° C./min. Thus, a Tg of 60° C. as measured according to DSC is equivalent to 70-72° C. when measured according to DMA as just described.

The Tg of the film is generally at least 20, 25, or 30° C. ranging up to 55, 56, 57, 58, 59, or 60° C. In some embodiments, the Tg of the film is at least 31, 32, 33, 34, or 35° C. In other embodiments, the Tg of the film is at least 36, 37, 38, 39, or 40° C. In yet other embodiments, the Tg of the film is at least 41, 42, 43, 44, or 45° C. In some embodiments, the film exhibits a single Tg as measured by DSC. Thus, the polymerized (meth)acrylic polymer and polyvinyl acetal polymer composition alone or in combination with crosslinker can exhibit a single Tg.

A single Tg is one indication of a single (e.g. continuous) phase morphology. Thus, the film, as well as the polymerized (meth)acrylic polymer and polyvinyl acetal polymer composition alone or in combination with crosslinker can be characterized as a single (e.g. continuous phase). Alternatively, the film or (e.g. radiation) cured composition can be tested by transmission electron microscopy (TEM) according to the test method described in the examples. Single (e.g. continuous) phase morphology is preferred for films having low haze and high transmission.

In other embodiments, the film, as well as the polymerized (meth)acrylic polymer and polyvinyl acetal polymer composition alone or in combination with crosslinker can be characterized as having a dispersed phase of polyvinyl acetal (e.g. butyral) in a continuous phase of (meth)acrylic polymer. The average dispersion size can be calculated by averaging the diameter of randomly chosen particles (e.g. 100 particles) of the dispersed phase utilizing TEM. The average dispersion size can range from 0.1 to 10 microns. In some embodiments, the average dispersion size is less than 0.5, 0.3, 0.4, 0.3, 0.1 microns. An average dispersion size of less than 0.1 microns can also provide films having a low haze and high transmission.

The film can be characterized by tensile and elongation according to the test method described in previously cited WO2016/094277. The tensile and elongation properties can pertain to the acrylic polyvinyl acetal film layer alone or in combination with the (e.g. PSA) adhesive. In some embodiments, the tensile strength is at least 10, 11, 12, 13, 14 or 15 MPa and typically no greater than 50, 45, 40, or 35 MPa. The elongation at break can ranges from 2, 3, 4 or 5% up to about 150%, 200% or or 300% and greater. In some embodiments, the elongation is at least 50, 100, 150, or 175% and may range up to 225, 250, 275, or 300%.

The film is preferably non-tacky to the touch at room temperature (25° C.) and preferably at (e.g. storage or shipping) temperatures ranging up to (120° F.) 50° C. In some embodiments, the films may exhibit a low level of adhesion to glass. For example, the 180° peel values can be about 2 oz/inch or less at a 12 inch/minute peel rate.

A layer of an adhesive composition is proximate the first film or second backing. The adhesive is typically disposed directly on the first film or second backing or may comprise a primer or adhesion promoting treatment between the first film or backing and the adhesive layer. The type of primer will vary with the type of film and adhesive used and one skilled in the art can select an appropriate primer. Examples of suitable primers include chlorinated polyolefins, polyamides, and modified polymers disclosed in U.S. Pat. Nos. 5,677,376, 5,623,010 and those disclosed in WO 98/15601 and WO 99/03907, and other modified acrylic polymers. Typically, primers are dispersed into a solvent at very low concentrations, e.g., less that about 5% solids, and coated onto the film, and dried at room or elevated temperatures to form a very thin layer. Typical solvents used may include water, heptane, toluene, acetone, ethyl acetate, isopropanol, and the like, used alone or as blends thereof.

The adhesive layer may be any suitable adhesive. Non-limiting examples of adhesives include pressure sensitive adhesives, heat activated adhesives, radiation curable adhesives, and the like. Examples of formulation types include solvent-based solutions, water-based latex, microspheres, hot melt coatable, and suitable combinations thereof. The pressures sensitive adhesive (PSA) may be any type of PSA such as those described in the *Handbook of Pressure-Sensitive Adhesives*, Ed. D. Satas, 2nd Edition, Von Nostrand Reinhold, New York, 1989. Classes of useful pressure sensitive adhesives include, for example, rubber resin materials such as tackified natural rubbers or those based on synthetic rubbers, styrene block copolymers, polyvinyl ethers, acrylics (including both acrylates and methacrylates), polyurethanes, poly-alpha-olefins, silicone resins, and the like. Combinations of these adhesives can be used. Additionally, further useful adhesives include those that may be activated at elevated temperature for application at use temperature. These generally meet the Dahlquist criterion at use temperature.

The pressure sensitive adhesive may be inherently tacky. If desirable, tackifiers may be added to a pressure sensitive adhesive base material to form the pressure sensitive adhesive. Useful tackifiers include, for example, rosin ester resins, aromatic hydrocarbon resins, aliphatic hydrocarbon resins, mixed aromatic/aliphatic hydrocarbon resins, and terpene resins. Other materials can be added for special purposes, including, for example, oils, plasticizers, antioxidants, ultraviolet ("UV") stabilizers, hydrogenated butyl rubber, pigments, fillers, curing agents, and crosslinkers. Some examples of fillers or pigments include zinc oxide, titanium dioxide, silica, carbon black, metal powders and calcium carbonate.

The adhesive layer may be applied using any conventional technique known to those skilled in the art. For example, the adhesive layer can be applied onto the film surface by coating, using for example a rotary rod die, slit die or gravure roll, or extrusion coating with conventional coating weights (e.g. 0.0004 to 0.008 g/cm2). The application of the adhesive layer may also be achieved by laminating the film with an adhesive layer, optionally covered by a release liner. When a release liner is used, the adhesive is either coated on the liner and laminated to the film or coated on the film and the release liner subsequently applied to the adhesive layer. The adhesive layer may be applied as a continuous layer, or a patterned, discontinuous layer. The adhesive layer typically has a thickness of about 5 to about 50 micrometers.

Examples of adhesives include PSA's, hot melt or heat activated adhesives that are the pressure sensitive at the time of application such as pressure sensitive adhesives disclosed in U.S. Pat. No. 4,994,322 (Delgado et al), U.S. Pat. No. 4,968,562 (Delgado), EP 0 570 515, and EP 0 617 708; and the pressure sensitive adhesives disclosed in U.S. Pat. Nos. 5,296,277 and 5,362,516 (both Wilson et al) and 5,141,790 (Calhoun et al) and WO 96/1687 (Keller et al.) Other examples of PSA's are described in U.S. Pat. No. Re 24,906 (Ulrich), U.S. Pat. No. 4,833,179 (Young et al), U.S. Pat. No. 5,209,971 (Babu et al), U.S. Pat. No. 2,736,721 (Dester), and U.S. Pat. No. 5,461,134 (Leir et al). Acrylate-based PSA's include those described in U.S. Pat. No. 4,181,752 (Clemens et al) and U.S. Pat. No. 4,418,120 (Kealy et al), WO 95/13331.

In some embodiments, the adhesive layer is a repositionable adhesive layer. The term "repositionable" refers to the ability to be, at least initially, repeatedly adhered to and removed from a substrate without substantial loss of adhesion capability. A repositionable adhesive usually has a peel strength, at least initially, to the substrate surface lower than that for a conventional aggressively tacky PSA. Suitable repositionable adhesives include the adhesive types used on CONTROLTAC Plus Film brand and on SCOTCHLITE Plus
Sheeting brand, both made by Minnesota Mining and Manufacturing Company, St. Paul, Minn., USA.

The adhesive layer may also be a structured adhesive layer or an adhesive layer having at least one microstructured surface. Upon application of film article comprising such a structured adhesive layer to a substrate surface, a network of channels or the like exists between the film article and the substrate surface. The presence of such channels or the like allows air to pass laterally through the adhesive layer and thus allows air to escape from beneath the film article and the surface substrate during application.

Topologically structured adhesives may also be used to provide a repositionable adhesive. For example, relatively large scale embossing of an adhesive has been described to permanently reduce the pressure sensitive adhesive/substrate contact area and hence the bonding strength of the pressure sensitive adhesive. Various topologies include concave and convex V-grooves, diamonds, cups, hemispheres, cones, volcanoes and other three dimensional shapes all having top surface areas significantly smaller than the base surface of the adhesive layer. In general, these topologies provide adhesive sheets, films and tapes with lower peel adhesion values in comparison with smooth surfaced adhesive layers. In many cases, the topologically structured surface adhesives also display a slow build in adhesion with increasing contact time.

An adhesive layer having a microstructured adhesive surface may comprise a uniform distribution of adhesive or composite adhesive "pegs" over the functional portion of an adhesive surface and protruding outwardly from the adhesive surface. A film article comprising such an adhesive layer provides a sheet material that is repositionable when it is laid on a substrate surface (See U.S. Pat. No. 5,296,277). Such an adhesive layer also requires a coincident microstructured release liner to protect the adhesive pegs during storage and processing. The formation of the microstructured adhesive surface can be also achieved for example by coating the adhesive onto a release liner having a corresponding micro-embossed pattern or compressing the adhesive, e.g. a PSA, against a release liner having a corresponding micro-embossed pattern as described in WO 98/29516.

If desired, the adhesive layer may comprise multiple sub-layers of adhesives to give a combination adhesive layer assembly. For example, the adhesive layer may comprise a sub-layer of a hot-melt adhesive with a continuous or discontinuous overlayer of PSA or repositionable adhesive.

The adhesive layer may optionally be protected with a release liner. The release liner is preferably adhesive-repellant and more specifically comprises paper or film, which has been coated or modified with compounds of low surface energy relative to the adhesive applied. Organosilicone compounds, fluoropolymers, polyurethanes and polyolefins can serve this purpose. The release liner can also be a polymeric sheet produced from polyethylene, polypropylene, PVC, polyesters with or without the addition of adhesive-repellant compounds. As mentioned above, the release liner may have a microstructured or micro-embossed pattern for imparting a structure to the adhesive layer.

Alternatively the exposed surface of the film (e.g. structured layer or cured filling material) may be coated with a suitable release material, also referred to in the art as a low adhesive backsize (LAB). Release materials are known and include materials such as, for example, silicone, polyethylene, polycarbamate, polyacrylics, and the like. In some embodiments, the adhesive is an acrylic heat activated adhesive or acrylic pressure sensitive adhesive. Such adhesives can comprise the same general components as the (meth) acrylic polymer of the film. However, the adhesives generally comprise different concentrations of such components. For example, the adhesives often comprise a higher concentration of polymerized units of low Tg alkyl monofunctional (meth)acrylate monomer and/or a sufficient concentration of tackifer to lower the Tg and the tensile elastic modulus. In one embodiment, the acrylic adhesive comprises at least 65, 70, 75, 80, 85 or 90 wt.-% of polymerized units of low Tg alkyl monofunctional (meth)acrylate monomer, as previously described. In some embodiments, the acrylic adhesive comprises at least 0.1, 0.5, 1, 2, 3, 4, 5, 6, 7, 8, 9, or 10 wt.-% of a polar monomer, such as an acid functional monomer. The maximum concentration of polar monomer is the same as previously described for the film. In some embodiments, the acrylic adhesive comprises at least 0.4, 1, 1.5 or 2 wt-% up to about 10 or 15 wt-% of polymerized crosslinker units. The crosslinker may comprise a (meth)acrylate group and an olefin group as previously described. Alternatively, the acrylic adhesive may comprise a small concentration, e.g. less than 1 wt.-% of a triazine crosslinker. In some embodiments, the acrylic adhesive comprises greater than 5, 10, or 15 wt-% of tackifier and typically no greater than 20, 30, 40, or 50 wt.-%. In typical embodiments, the adhesive does not comprise a polyvinyl acetal (e.g. butyral) polymer.

In some embodiments, the film is a graphic film used to apply designs, e.g. images, graphics, text and/or information, on windows, buildings, pavements or vehicles such as autos, vans, buses, trucks, streetcars and the like for e.g. advertising or decorative purposes. Many of the surfaces, e.g. vehicles, are irregular and/or uneven.

In other embodiments, the film is a decorative tape.

In yet other embodiments, the film is a synthetic textile such as synthetic leather.

| Materials | |
|---|---|
| Designation | Description |
| EHA | 2-Ethylhexyl acrylate, available from BASF, Florham Park, NJ. |
| IBOA | Isobornyl acrylate, available from San Esters, New York, NY. |
| AA | Acrylic acid, available from BASF, Florham Park, NJ. |
| HEA | 2-Hydroxyl ethyl acrylate, available from BASF, Florham Park, NJ. |
| IOA | Isooctyl acrylate, obtained from 3M Company, St. Paul, MN. |
| DPA | Dihydrocyclopentadienyl acrylate, available from BASF, Florham Park, NJ. |
| CN965 | An aliphatic polyester based urethane diacrylate oligomer available under the trade designation CN965 from Sartomer Americas, Exton, PA,. |
| CN2295 | A hexafunctional polyester acrylate oligomer available under the trade designation CN2295 from Sartomer Americas Exton, PA. |
| CN963B80 | An aliphatic polyester-based urethane diacrylate oligomer blended with 20% w/w hexanediol diacrylate, available under the trade designation CN963B80 from Sartomer Americas Exton, PA. |
| SR306HP | A tripropylene glycol diacyrylate, available under the trade designation SARTOMER SR306HP from Sartomer Americas, Exton, PA. |
| Irg 651 | 2,2-Dimethoxy-1,2-diphenylethan-1-one, available under the trade designation IRGACURE 651 from BASF Corporation, Vandalia, IL. |
| Irg 819 | Bis(2,4,6-trimethylbenzoyl)-phenylphosphineoxide, available under the trade designation IRGACURE 819 from BASF Corporation, Vandalia, IL. |
| Irg 1076 | Octadecyl-3-(3,5-di-tert•butyl-4-hydroxyphenyl)-propionate, available under the trade name IRGANOX 1076 from BASF Corporation, Vandalia, IL. |
| Tin 479 | A hydroxyphenyl-triazine (HPT) UV absorber, available under the trade designation TINUVIN 479 from BASF Corporation, Vandalia, IL. |
| Tin 928 | A UV absorber of the hydroxyphenyl benzotriazole class, available under the trade designation TINUVIN 928 from BASF Corporation, Vandalia, IL. |

Materials

| Designation | Description |
|---|---|
| Reg 6108 | A hydrocarbon resin produced by the polymerization and partial hydrogenation of pure monomer hydrocarbon feedstocks, having a glass transition temperature of 55° C. and a number average molecular weight of 750, available under the trade designation REGALREZ 6108 from Eastman Chemical Company, Kingsport, TN. |
| B60H | Poly(vinyl butyral) having a glass transition temperature (Tg) of 70° C., available under the trade designation MOWITAL B60H from Kuraray, Houston, TX. |
| White Pigment | A white pigment dispersion in phenoxyethyl acrylate, obtained as 9W1817 from Penn Color, Doylestown, PA. |
| Black Pigment 1 | A black pigment dispersion in phenoxyethyl acrylate, obtained as 9B117 from Penn Color, Doylestown, PA. |
| Black Pigment 2 | A black pigment dispersion in phenoxyethyl acrylate, obtained as PMX 4178 from Penn Color, Doylestown, PA. |
| Blue Pigment | A blue pigment dispersion in phenoxyethyl acrylate, obtained as 9S1494 from Penn Color, Doylestown, PA. |
| Magenta Pigment | A magenta pigment dispersion in dipropyleneglycol diacrylate, obtained as 9R1052 from Penn Color, Doylestown, PA |
| Red Pigment 2 | A red pigment dispersion in phenoxyethyl acrylate, obtained as 9R1517 from Penn Color, Doylestown, PA. |
| Purple Pigment | A purple pigment dispersion in phenoxyethyl acrylate, obtained as 9S9490 from Penn Color, Doylestown, PA. |
| Yellow Pigment | A yellow pigment dispersion in phenoxyethyl acrylate, obtained as 9Y1397 from Penn Color, Doylestown, PA. |
| Red Pigment 1 | A red pigment, obtained under the trade designation NEOPOLAR BRILLIANT RED B from CIBA-GEIGY Corporation, Ardsley, NY. |
| Blue Glitter | A blue polyester jewel having a diameter of 0.008 inches (203 micrometers), available under the trade designation BRILLIANT CANADIAN BLUE from Meadowbrook Inventions, Newton, NJ. |
| Red Glitter | A red polyester jewel having a diameter of 0.006 inches (0.152 micrometers), available under the trade designation HEX FIRE RED from Meadowbrook Inventions, Newton, NJ. |
| Triazine 1 | 2,4-bis(trichloromethyl)-6-(4-methoxyphenyl)-s-triazine, prepared as described in U.S. Pat. No. 3,277,091, column 2, line 73. |
| PET 1 | An untreated clear, amorphous, copolyester film having a nominal thickness of 51 micrometers (0.002 inches). |
| PET 2 | A clear, amorphous, copolyester film having a nominal thickness of 13 micrometers (0.0005 inches), obtained from Eastman Chemical Company, Kingsport, TN. Prior to use this was corona treated under a nitrogen atmosphere at 500 milliJoules/square centimeter. |
| PET 3 | A silicone release liner having a nominal thickness of 51 micrometers (0.002 inches), obtained from Dupont Teijin, Dupont Chemical Company, Wilmington DE. |
| Textured Paper 1 | A textured release liner commercially available under the trade designation BALLISTIC ULTRACAST from Sappi Warren Release Papers, Westbrook, ME. |
| Textured Paper 2 | A textured release liner commercially available under the trade designation HONEYCOMB ULTRACAST from Sappi Warren Release Papers, Westbrook, ME. |
| Textured Paper 3 | A textured release liner commercially available under the trade designation SPIRO ULTRACAST from Sappi Warren Release Papers, Westbrook, ME. |
| Textured Paper 4 | The liner from the inkjet printable film available under the trade designation 3M CONTROLTAC GRAPHIC FILM WITH COMPLY ADHESIVE IJ-180Cv3 from 3M Company, St. Paul, MN. |
| 1080 BR | A cast, 0.004 inch (90 micrometer) thick, poly(vinyl chloride) graphics film having a brushed metal texture and a metallic steel blue color and having a repositionable acrylic pressure sensitive adhesive covered with a paper release liner, available under the trade designation 3M WRAP FILM 1080-BR-217 BRUSHED STEEL BLUE from 3M Company, St. Paul, MN. |
| 1080 CF 1 | A cast, 0.004 inch (90 micrometer) thick, poly(vinyl chloride) graphics film having a carbon fiber texture and metallic anthracite color and having a repositionable acrylic pressure sensitive adhesive covered with a paper release liner, available under the trade designation 3M WRAP FILM 1080-CF201 ANTHRACITE from 3M Company, St. Paul, MN. |
| 1080 CF 2 | A cast, 0.004 inch (90 micrometer) thick, poly(vinyl chloride) graphics film having a carbon fiber texture and white color and having a repositionable acrylic pressure sensitive adhesive covered with a paper release liner, available under the trade designation 3M WRAP FILM 1080-CF201 CARBON FIBER WHITE from 3M Company, St. Paul, MN. |
| BOPP 1 | A 0.0016 inch (41 micrometers) biaxially oriented polypropylene film which was corona treated under a nitrogen atmosphere at 500 milliJoules/square centimeter. |
| Fumed Silica | A fumed silica after-treated with dimethyldichlorosilane, available under the trade designation AEROSIL R 972 from Evonik Industries, Essen, Germany. |

-continued

Materials

| Designation | Description |
|---|---|
| XP 2617 | A largely linear diisocyanate prepolymer based on hexamethylene diisocyanate and an ether diol, having an NCO content of 12.5 wt %, available under the trade designation DESMODUR XP 2617 from Bayer Material Science, Leverkusen, Germany. |
| MEK | Methyl ethyl ketone |
| PS90 | A water-based acrylic pressure sensitive adhesive available under the trade designation ROBOND PS90 from Dow Chemical Company, Midland, MI. |

Curing of the Film and Adhesive Compositions

All the UVA cured films and adhesive compositions were cured by exposure a UVA light source having a UVA maximum in the range of 350-400 nanometers. The total UVA energy was determined using a POWERMAP radiometer equipped with low power sensing head (available from EIT Incorporated, Sterling, Va.). The radiometer web speed and energy were then used to calculate the total UVA energy. The radiometer web speed was used to calculate the total exposure time.

Test Methods

90 Degree Angle Peel Strength

A tape sample measuring 0.5 inches (1.27 centimeters) wide by approximately 12 inches (30.5 centimeters) long in the machine direction was conditioned at 23° C. and 50% relative humidity for at least 24 hours prior to testing. It was then placed on un-used, anodized aluminum panels and rolled down back and forth one time using a 4.5 pound (2 kilogram) rubber hand roller. Samples were tested at 90 inches per minute (228.6 centimeters/minute) and averaged over 5 seconds. The results were recorded in ounces force/0.5 inch, and reported ounces force/0.5 inch (Newtons/decimeter). The failure mode was noted and recorded. An adhesive failure mode was assigned where the adhesive removed entirely from the substrate to which it was bonded. A cohesive failure mode was assigned where the adhesive layer split with some being still bonded to the backing and some still bonded to the substrate. A two bond failure mode was assigned where the adhesive removed entirely from the film backing to which it was bonded.

Shear Strength

Stainless steel (SS) plates, measuring 5.1 centimeters (2 inches) long by 3.8 centimeters (1.5 inches) wide by 0.13 centimeters (0.050 inches) thick, were prepared for testing by cleaning with methyl ethyl ketone and a clean tissue (available under the trade designation KIMWIPE, available from Kimberly-Clark Corporation, Neenah, Wis.) three times with the last cleaning taking place immediately preceding sample preparation. The adhesive tapes were cut into strips measuring 1.27 centimeters (0.5 inch) wide and at least 15 centimeters (6 inches) long and bonded to the plate such that the contact area was 1.27 centimeters by 2.54 centimeters long. A 2 kilogram (4.5 pound) rubber roller was then rolled back and forth one time over the assembly. The assembly was equilibrated at 23° C. and 50% relative humidity for 15 minutes after which it was transferred to a 158° F. (70° C.) oven, positioned vertically at an angle of 2 degrees, and a 500 gram weight was attached to the assembly by the remaining length of tape that extended beyond the bonded area. The time (in minutes) at which the bond failed was recorded. The test was discontinued after 1,200 minutes if there was no failure and the result recorded as 1200. Three specimens of each sample were tested and averaged to provide the result reported.

180 Degree Angle Peel Adhesion Strength

Stainless steel (SS) plates, measuring 12.7 centimeters (5 inches) long by 5.1 centimeters (2 inches) wide by 0.13 centimeters (0.050 inches) thick, were prepared for testing by cleaning with methyl ethyl ketone and a clean tissue (available under the trade designation KIMWIPE, available from Kimberly-Clark Corporation, Neenah, Wis.) three times with the last cleaning taking place immediately preceding sample preparation. The adhesive tapes were cut into strips measuring 1.27 centimeters (0.5 inch) wide and at least 20 centimeters (8 inches) long and bonded to the plate such that the contact area was 1.27 centimeters (0.5 inches) by approximately 15.2 centimeters (6 inches) long. A 2 kilogram (4.5 pound) rubber roller was then rolled back and forth twice over the assembly. The assembly was equilibrated at 23° C. and 50% relative humidity for 15 minutes then tested. The peel test was run at an angle of 180 degrees and at a rate of 305 millimeters/minute (12 inches/minute) with an averaging time of 5 seconds using a using peel tester (Model IMASS SP-200 Slip/Peel Tester, available from IMASS, Incorporated, Accord, Mass.). Two samples were evaluated and the results were recorded in ounces force/0.5 inch and converted to ounces force/inch (Newtons/decimeter).

Determination of Tensile Storage Modulus (E')

Some of the films and adhesives were analyzed by Dynamic Mechanical Analysis (DMA) using a DMAQ800 from TA Instruments in tensile mode to characterize the physical properties of each sample as a function of temperature. Rectangular samples, 6.2 mm wide and 0.05-0.07 mm thick, were clamped into the film tension clamps of the instrument at 17-19 mm length. The furnace was closed and the temperature was equilibrated at −50° C. and held for 5 minute. The temperature was then ramped from −50° C. to 50° C. at 2° C./min while the sample was oscillated at a frequency of 1 Hertz and a constant strain of 0.1 percent. The tensile storage modulus (E') at 25° C. was recorded in MPa.

Colored, Multilayer Films with Pressure Sensitive Adhesive

Preparation of Base Syrups 1-2

Base Syrup 1 was prepared by mixing the components in the amounts shown in Table 1 below as follows. Acrylic monomers, crosslinker, ultra-violet absorbers (UVAs) and photoinitiator were combined in a 1 gallon (3.79 liters) glass jar and mixed using a high shear electric motor to provide a homogeneous mixture. Next, B60H was then added over a period of about three minutes with mixing. This was followed by further high speed mixing until a homogeneous, viscous solution was obtained. This was then degassed for ten minutes at a vacuum of 9.9 inches (252 millimeters) mercury. The XP 2617 was added to the syrup immediately prior to coating.

Base Syrup 2 was prepared in the same manner as Base Syrup 1 using the amounts shown in Table 1.

TABLE 1

| Base Syrup | EHA | IBOA | AA | HEA | CN965 | XP2617 | Irg 651 | Irg 819 | B60H | Tin 479 | Tin 928 |
|---|---|---|---|---|---|---|---|---|---|---|---|
| Base Syrup Formulations (parts by weight) | | | | | | | | | | | |
| 1 | 29.5 | 8.2 | 20.2 | 20.2 | 2.6 | 2.6 | 0.32 | 0 | 16.4 | 0.05 | 0.10 |
| 2 | 29.8 | 8.3 | 20.4 | 20.4 | 2.6 | 0 | 0 | 2.0 | 16.6 | 0 | 0 |

Preparation of Pigmented Syrups 1-2

Pigmented syrups were prepared by adding the desired amount of Base Syrup 2 to a 1 quart (0.95 liter) glass jar, followed by pigment, in parts per one hundred (pph) parts of base syrup, as shown in Table 2. The pigmented syrups were then mixed at 3,000 revolutions per minute (rpm) for 5 minutes using a 1.5 inch Cowles blade.

TABLE 2

Pigmented Syrup Formulations

| Syrup Identification | Pigment | Pigment Loading (pph) |
|---|---|---|
| Black Pigment Syrup 1 | Black Pigment 1 | 6 |
| Red Pigment Syrup 1 | Red Pigment 1 | 5 |

Example 1

Base Syrup 1 was coated using a notch bar coater at a thickness of 0.0005 inches (13 micrometers) onto the surface of 1080 CF1 opposite the side having the pressure sensitive adhesive layer, and brought into intimate contact with PET 1. The syrup was cured by exposing the PET 1 surface to UVA energy for 300 seconds such that the total UVA energy was 1800 milliJoules/square centimeter. The PET 1 was removed, giving a flexible, multilayer article having a pressure sensitive adhesive on one outer surface and an acrylic/PVB film layer on the other outer surface. This article had a smooth, glossy surface and a textured two-toned, metallic anthracite colored appearance.

Example 2

Base Syrup 1 was coated, using a notch bar coater at a thickness of 0.0005 (13 micrometers) onto the surface of 1080 BR opposite the side having the pressure sensitive adhesive layer, and brought into intimate contact with PET 1. The syrup was exposed to UVA energy as described in Example 1. The PET 1 was removed, giving a flexible, multilayer article having a pressure sensitive adhesive on one outer surface and an acrylic/PVB film layer on the other outer surface. This article had a smooth, glossy surface and a brushed metal steel blue appearance.

Example 3

Black Pigment Syrup 1 was squeegee coated onto the surface of 1080 CF2 opposite the side having the pressure sensitive adhesive layer, and brought into intimate contact with PET 1. The syrup was exposed to UVA energy, as described in Example 1. The PET 1 was removed, giving a flexible, multilayer article having a pressure sensitive adhesive on one outer surface and an acrylic/PVB film layer on the other outer surface. The article had a smooth, glossy surface and a gray colored lattice-work appearance having black borders therein.

Example 4

Red Pigment Syrup 1 was squeegee coated onto the surface of 1080 CF1 opposite the side having the pressure sensitive adhesive layer. This coated article was then further overcoated with Base Syrup 1 at a notch bar coater at a thickness of 0.002 inches (51 micrometers), and brought into intimate contact with PET 1. The syrup was exposed to UVA energy, as described in Example 1. The PET 1 was removed, giving a flexible, multilayer article having a pressure sensitive adhesive on one outer surface and an acrylic/PVB film layer on the other outer surface. The article had a smooth, glossy surface and a textured two-toned, metallic purple colored appearance.

TABLE 3

| Base Syrup | EHA | IBOA | AA | HEA | CN965:IBOA/1:1 | CN2295 | Irg 651 | Irg 819 | B60H |
|---|---|---|---|---|---|---|---|---|---|
| Base Syrup Formulations (parts by weight) | | | | | | | | | |
| 3 | 27.7 | 12.6 | 11.5 | 11.5 | 16.2 | 0 | 0 | 1.00 | 19.4 |
| 4 | 29.4 | 13.4 | 12.2 | 12.2 | 17.1 | 0 | 0 | 1.00 | 14.7 |
| 5 | 26.8 | 16.1 | 11.2 | 11.2 | 15.6 | 0.15 | 0.22 | 0 | 18.8 |
| 6 | 30.8 | 14.1 | 12.9 | 12.9 | 18.0 | 0 | 0 | 0.99 | 10.4 |

Preparation of Base Syrups 3-5

Base Syrups 3-5 were prepared in the same manner as Base Syrup 1 using the amounts shown in Table 3.

Preparation of Pigmented Syrups

Pigmented syrups were prepared by adding a Base Syrup to a 1 quart (0.95 liter) glass jar, followed by pigment, in parts per one hundred (pph) parts of base syrup, as shown in Table 4. The pigmented syrups were then mixed at 3,000 revolutions per minute (rpm) for 5 minutes using a 1.5 inches Cowles blade.

TABLE 4

Pigmented Syrup Formulations

| Notebook Reference | Syrup Identification | Base Syrup | Pigment | Pigment Loading (pph) |
|---|---|---|---|---|
| 98C4 | Black Pigment Syrup 2 | 4 | Black Pigment 2 | 3.0 |
| MK-B2 | Black Pigment Syrup 3 | 3 | Black Pigment 2 | 2.5 |
| 98C9 | White Pigment Syrup 1 | 4 | White Pigment | 15 |
| 98C5 | Blue Pigment Syrup | 4 | Blue Pigment | 10 |
| A4-24 | White Pigment Syrup 2 | 6 | White Pigment | 10 |

Preparation of Glitter Syrups

Glitter syrups were prepared by adding a Base Syrup to a 1 quart (0.95 liter) glass jar, followed by glitter, in parts per one hundred (pph) parts of base syrup, as shown in Table 5. The glitter syrups were then mixed at 3,000 revolutions per minute (rpm) for 5 minutes using a 1.5 inches Cowles blade.

TABLE 5

Glitter Syrup Formulations

| Syrup Identification | Base Syrup | Glitter ID | Glitter Loading (pph) |
|---|---|---|---|
| Blue Glitter Syrup | 5 | Blue Glitter | 15 |
| Red Glitter Syrup | 6 | Red Glitter | 15 |

Example 5

Black Pigment Syrup 2 was coated between Textured Paper 1 and BOPP 1 using a two-roll coater having a gap setting of 0.002 inches (51 micrometers) greater than that combined thickness of the two liners. The syrup was cured by exposing the BOPP 1 surface to UVA energy for 228 seconds such that the total UVA energy was 912 milliJoules/square centimeter. Textured Paper 1 was removed, giving a two-layered, colored article having a textured surface on the exposed surface of the cured acrylic/PVB film. PS90 was then coated onto the exposed BOPP 1 surface using a notch bar coater at a thickness of 0.002 inches (51 micrometers) and dried at 70° C. for 15 minutes. A flexible, black colored, multilayer article having a pressure sensitive adhesive on one outer surface and a structured, acrylic/PVB film layer on the other outer surface was obtained.

Example 6

White Pigment Syrup 1 was coated at a thickness of 0.002 inches (51 micrometers) using a notch bar coater onto PET 2 and Blue Pigment Syrup was squeegee coated onto Textured Paper 2. The two coated liners were brought into intimate contact using a two-roll coating station using a gap setting of 0.002 inches (51 micrometers) greater than the combined thickness of the uncoated liners. The syrup was cured by exposing the PET 2 surface to UVA energy for 228 seconds such that the total UVA energy was 1368 milli-Joules/square. Textured Paper 2 was removed to give a three-layered article having a two-tone (white and blue) colored appearance, and a textured surface on the exposed surface of the cured acrylic/PVB film. PS90 was then coated onto the exposed PET 2 surface as described in Example 5. A flexible, two-tone colored, multilayer article having a pressure sensitive adhesive on one outer surface and a structured, acrylic/PVB film layer on the other outer surface was obtained.

Example 7

Black Pigment Syrup 3 was coated at a thickness of 0.005 inches (127 micrometers) using a notch bar coater onto BOPP 1, and Blue Glitter Syrup was coated at a thickness of 0.004 inches (102 micrometers) using a notch bar coater onto PET 1. The two coated liners were then brought into intimate contact using a two-roll coating station having a total gap setting of 0.0136 inches (345 micrometers), and exposed to a total UVA energy, as described in Example 6. PET 1 was removed to give a three-layered article having a glossy glittered appearance. PS90 was then coated onto the exposed BOPP 1 surface as described in Example 5. A flexible, multilayer article having an acrylic/PVB film with a glossy glittered appearance on one side, and a pressure sensitive adhesive on the other side was obtained.

Example 8

White Pigment Syrup 2 was squeegee coated onto Textured Paper 3. The coated composition was partially cured by for about 5 seconds by exposure to a total UVA energy of 60 milliJoules/square centimeter. Following irradiation, the exposed surface of the acrylic/PVB film was coated with Red Glitter Syrup and the Red Glitter Syrup was covered with BOPP 1 using a two-roll coating station having a gap setting of 0.002 inches (51 micrometers) greater than the combined thickness of the BOPP 1 and coated Textured Paper 3. The syrups was then cured by exposing the BOPP 1 surface to a total UVA energy of 1368 milliJoules/square centimeter. PS90 was then coated onto the exposed BOPP 1 surface as described in Example 5. A flexible, multilayer article with a two-tone (red and white) structured surface and having a pressure sensitive adhesive on one outer surface was obtained.

Acrylic Films with Pressure Sensitive Adhesive
Base Syrup Preparation

Base Syrup 7 was prepared in the same manner as Base Syrup 1 using the amounts shown in Table 6.

TABLE 6

Base Syrup Formulations (parts by weight)

| Base Syrup | EHA | IBOA | AA | HEA | CN965:IBOA/1:1 | Irg 651 | B60H |
|---|---|---|---|---|---|---|---|
| 7 | 19.8 | 20.9 | 11.6 | 11.6 | 16.3 | 0.23 | 19.6 |

Adhesive Syrup Preparations
Adhesive Syrup 1

Adhesive Syrup 1 was prepared by charging a one gallon (3.8 liters) jar with IOA, AA, and Irg 651 in the amounts shown in Table 7, and stirred until the photoinitiator had dissolved and a homogeneous mixture was obtained. The mixture was degassed by introducing nitrogen gas into it through a tube inserted through an opening in the jar's cap and bubbling vigorously for at least 5 minutes. While stirring, the mixture was exposed to UVA light until a pre-adhesive syrup having a viscosity deemed suitable for coating was formed. Following UV exposure, air was introduced into the jar. Following prepolymerization, 0.1 pph Triazine 1 was mixed into the syrup by rolling overnight.

Adhesive Syrup 2

Adhesive Syrup 2 was prepared by charging a one gallon (3.8 liters) jar with 1784 grams IOA, 16.2 grams AA, 360 grams IBOA, 54 grams DPA, and 0.72 grams 651 photoinitiator and stirred until the photoinitiator had dissolved and a homogeneous mixture was obtained. The mixture was degassed by introducing nitrogen gas into it through a tube inserted through an opening in the jar's cap and bubbling vigorously for at least 5 minutes. While stirring, the mixture was exposed to UVA light until a pre-adhesive syrup having a viscosity deemed suitable for coating was formed. Following UV exposure, air was introduced into the jar. Next, 360 grams IBOA, 4.32 grams Irg 651, 518.4 grams Reg 6108, and 1.35 grams Irg 1076 were added to the pre-adhesive syrup and mixed by rolling overnight.

TABLE 7

| Adhesive Syrup Formulations (parts by weight) | | | | | | | | |
|---|---|---|---|---|---|---|---|---|
| Adhesive Syrup | IOA | IBOA | AA | DPA | Irg 651 | Reg 6108 | Irg 1076 | Triazine 1 |
| 1 | 89.8 | 0 | 10.0 | 0 | 0.2 | 0 | 0 | 0.10 |
| 2 | 57.6 | 23.2 | 0.5 | 1.7 | 0.2 | 16.7 | 0.04 | 0 |

The tensile elastic modulus of cured adhesive syrup 2 was measured and determined to be 0.05 MPa at 25° C. and 1 hertz.

Example 9

Base Syrup 7 was coated using a notch bar coater at a thickness of 0.002 inches (51 micrometers) onto PET 1. The syrup was partially cured by exposing the open surface of the syrup in a nitrogen-inerted environment to a total UVA energy of approximately 90 milliJoules/square centimeter. Following irradiation, the acrylic/PVB film/PET 1 combination was coated on the exposed acrylic/PVB film surface with Adhesive Syrup 1 using a notch bar coater at a thickness of 0.002 inches (51 micrometers) and the open surface of the adhesive in a nitrogen-inerted environment exposed to a total UVA energy of 958 milliJoules/square centimeter. Upon removal of PET 1 an article having an acrylic/PVB film backing with PSA on one side was obtained. This was evaluated for 90 Degree Angle Peel Strength.

Comparative Example 1 was a double coated tape having a 0.0005 inch (12 micrometers) thick polyester film with a 0.0027 inch (69 micrometers) thick adhesive on each side, and polycoated Kraft paper liners over each adhesive layer. The adhesive was the same composition as Example 9 prepared by coating and curing the syrup on polyester (rather than acrylic/PVB) film. As evident by the following test results, Example 9 exhibited better adhesion to the acrylic/PVB film compared to a polyester backing.

TABLE 8

| Example | Adhesive thickness (inches) | 90 Degree Angle Peel Adhesion Strength (ozf/0.5 inch) | 90 Degree Angle Peel Adhesion Strength (N/dm) | Failure Mode |
|---|---|---|---|---|
| 9 | 0.0020 | 28 | 61.3 | cohesive |
| C1 | 0.0027 | 33 | 72.2 | two bond |

Example 10

Base Syrup 7 was coated using a notch bar coater at a thickness of 0.002 inches (51 micrometers) onto a second sample of PET 3. Base Syrup 7 was partially cured by exposing the open surface of the composition in a nitrogen-inerted environment to a total UVA energy of approximately 90 milliJoules/square centimeter to give an acrylic/PVB film on PET 3. A first layer of pressure sensitive adhesive was provided by coating Adhesive Syrup 2 onto PET 3 using a notch bar coater at a thickness of 0.002 inches (51 micrometers). The irradiated acrylic/PVB film/PET 3 combination was brought into intimate contact with the Adhesive Syrup 2 coated PET 3 using two-roll coating station having a total gap setting of 0.008 inches (203 micrometers) and exposed to a total UVA energy of 958 milliJoules/square centimeter. A construction having, in order, PET 3, a PSA, acrylic/PVB film, and PET 3 was obtained. Next, the PET 3 in contact with the acrylic film was removed. A second layer of pressure sensitive adhesive was provided by coating Adhesive Syrup 2 onto PET 3 using a notch bar coater at a thickness of 0.002 inches (51 micrometers) and brought into intimate contact with the exposed surface of the acrylic/PVB film using a two-roll coating station having a total gap setting of 0.010 inches (254 micrometers). The open surface of the second adhesive in a nitrogen-inerted environment was cured by exposure to a total UVA energy of 958 milliJoules/square centimeter.

A five layered construction having, in order, PET 3, an acrylic PSA, an acrylic/PVB film, an acrylic PSA, and PET 3 was obtained. Upon removal of both the PET 3 release liners an article having an acrylic/PVB film backing with PSA on both sides was obtained. This was evaluated for Shear Strength and 180 Degree Angle Peel Strength. The adhesive layers on both sides were evaluated.

Tape samples were tested for shear and peel properties according to Test Methods 2 and 3. The results are shown in Table 9.

TABLE 9

| | Peel and Shear Results for PSA-Containing Articles | | | | | | |
|---|---|---|---|---|---|---|---|
| | 180 Degree Angle Peel Adhesion Strength (First PSA) | | 180 Degree Angle Peel Adhesion Strength (Second PSA) | | Shear Strength (min) (First PSA) | Shear Strength (min) (Second PSA) | Shear Failure Mode |
| Example | ozf/in | N/dm | ozf/in | N/dm | | | |
| 10 | 46.8 | 5.12 | 72.6 | 7.95 | 1107.3 | 1200 | Popoff (one sample) |

NA: not applicable

Acrylic Films with Microstructured Pressure Sensitive Adhesive

Base Syrup Preparation

Base Syrups 8 and 9 were prepared in the same manner as Base Syrup 1 using the amounts shown in Table 10.

TABLE 10

Base Syrup Formulations (parts by weight)

| Base Syrup | EHA | IBOA | AA | HEA | CN965:IBOA/1:1 | CN965 | Irg 651 | Irg 819 | B60H | White Pigment |
|---|---|---|---|---|---|---|---|---|---|---|
| 8 | 29.6 | 13.5 | 12.3 | 12.3 | 17.2 | 0 | 0.25 | | 14.8 | 0 |
| 9 | 26.7 | 20.0 | 11.1 | 11.1 | 0 | 7.8 | 0 | 0.77 | 13.4 | 9.1 |

Adhesive Syrup Preparation

Adhesive Syrups 3-8 were prepared by combining EHA, AA, IBOA, DPA, and Irg 651 in a quart (0.95 liter) jar in the amounts shown in Table 11 and stirred until the photoinitiator had dissolved and a homogeneous mixture was obtained. The mixture was degassed by introducing nitrogen gas into it through a tube inserted through an opening in the jar's cap and bubbling vigorously for at least 5 minutes. While stirring, the mixture was exposed to UVA light until a pre-adhesive syrup having a viscosity deemed suitable for coating was formed. Following UV exposure, air was introduced into the jar. Next, 0.67 grams Irg 651 was added to the pre-adhesive syrup and mixed by rolling overnight.

TABLE 11

Adhesive Syrup Formulations (parts by weight)

| Adhesive Syrup | EHA | IBOA | AA | DPA | Irg 651 |
|---|---|---|---|---|---|
| 3 | 88.2 | 2.9 | 6.9 | 2.0 | 0.04 |
| 4 | 86.5 | 2.9 | 6.7 | 3.8 | 0.04 |
| 5 | 83.3 | 2.8 | 6.5 | 7.4 | 0.04 |
| 6 | 85.3 | 5.9 | 6.9 | 2.0 | 0.04 |
| 7 | 83.6 | 5.8 | 6.7 | 3.8 | 0.04 |
| 8 | 80.5 | 5.6 | 6.5 | 7.4 | 0.04 |

Example 11

Adhesive Syrup 3 was coated at a thickness of 0.003 inches (76 micrometers) using a notch bar coater onto Textured Paper 4. The open surface of the syrup in a nitrogen-inerted environment was exposed to a total UVA energy of 385 milliJoules/square centimeter. Following irradiation, the exposed surface of Adhesive Syrup 3 was coated with Base Syrup 8 and covered with PET 3 using a two-roll coating station using a gap setting of 0.002 inches (51 micrometers) greater than the combined thickness of the PET 3 and coated Textured Paper 4 liner. The base syrup was cured by exposing the PET 3 surface to a total UVA energy of 1824 milliJoules/square centimeter. A four layered construction having, in order, PET 3, an acrylic/PVB film, an acrylic PSA, and Textured Paper 4 was obtained. Upon removal of both the PET 3 release liner and Textured Paper 4 an article having an acrylic/PVB film backing with PSA on one side was obtained. This was evaluated for 180 Degree Angle Peel Strength.

Example 12

Example 11 was repeated with the following modification. Adhesive Syrup 4 was used in place of Adhesive Syrup 3.

Example 13

Example 11 was repeated with the following modification. Adhesive Syrup 5 was used in place of Adhesive Syrup 3.

Example 14

Example 11 was repeated with the following modification. Adhesive Syrup 6 was used in place of Adhesive Syrup 3.

Example 15

Example 11 was repeated with the following modification. Adhesive Syrup 7 was used in place of Adhesive Syrup 3.

Example 16

Example 11 was repeated with the following modification. Adhesive Syrup 8 was used in place of Adhesive Syrup 3.

Example 17

Example 11 was repeated with the following modifications. Adhesive Syrup 8 was used in place of Adhesive Syrup 3 and Base Syrup 9 was used in place of Base Syrup 8.

TABLE 12

180 Degree Angle Peel Adhesion Strength

| | 180 Degree Angle Peel Adhesion Strength | |
|---|---|---|
| Example | (ozf/in) | (N/dm) |
| 11 | 25.3 | 27.7 |
| 12 | 24.9 | 27.2 |
| 13 | 14.3 | 15.7 |
| 14 | 18.5 | 20.2 |
| 15 | 12.0 | 13.1 |
| 16 | 19.9 | 21.7 |
| 17 | 14.8 | 16.2 |

The morphology, transmission, haze, and clarity of a representative film, the acrylic/PVB film of Example 9 prepared from Base Syrup 7, was evaluated using the following test methods. The test results are reported in Table 13 below.

Transmission, Haze and Clarity were measured using a BYK Haze-gard plus, CAT #4725.

Morphology Characterization by Transmission Electron Microscopy (TEM)

Analytical characterization of the sample morphology was carried out by transmission electron microscopy (TEM). All the film samples were imaged in cross-section.

Sample Preparation

The film samples were prepared using room-temperature ultramicrotomy as follows: 1) roughly ¼" by ¼" sections were cut from the film samples using a scalpel blade. These sections were embedded in Scotchcast #5 electrical resin. The embedded samples were allowed to room-temperature cure overnight; 2) thin slices of the embedded film (in cross-section) were cut by ultramicrotomy (Leica FC7) using a diamond knife. Slice thickness varied from 110 nm to 150 nm, depending on the sample. Cutting speed was 0.15 mm/sec; 3) the thin slices were floated onto distilled/deionized water, and then collected onto a standard TEM sample grid: A carbon/formvar film supported on a 3 mm diameter, 150 mesh Cu grid.

Imaging

The prepared thin sections were imaged by TEM (FEI Osiris, 200 kv field emission TEM). Magnification range was from 450× to 20,000× (instrument magnification). Various imaging modes were employed to characterize the morphology. They are briefly described below:

TEM: Conventional Transmission Electron Microscopy is a microscopy technique in which a beam of electrons is transmitted through an ultra-thin specimen, in this case 110-150 nm, interacting with the specimen as it is transmitted through. An image is formed as a result of the electron/sample interactions. At the lower magnifications used here, TEM image contrast is primarily due to the variations in the thickness, structure and composition in the material.

STEM: Scanning Transmission Electron Microscopy. An alternate mode of imaging in the TEM: In this case the electron beam is rastered in much the same way as in an SEM image, but with a significantly smaller probe size. Probe size for this imaging mode ranges from 0.5 nm to 5 nm.

HAADF: High Angle Annular Dark Field imaging mode. HAADF images are formed by collecting the scattered (vs. transmitted) electrons with an annular dark-field detector. The high angle, incoherently scattered electrons which form the image are highly sensitive to variations in the average atomic number, thus the contrast in these images is compositionally sensitive. The HAADF imaging mode is also known as Z-contrast imaging.

TABLE 13

| Ex. | Transmission | Haze | Clarity | Morphology by TEM Analysis |
|---|---|---|---|---|
| 9 | 94.6 | 8.2 | 90.4 | Single phase |

What is claimed is:

1. A film comprising a (meth)acrylic polymer and polyvinyl acetal polymer composition comprising polymerized units having the following formula

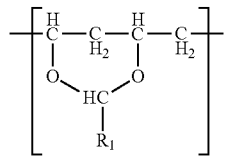

wherein $R_1$ is hydrogen or a C1-C7 alkyl group; and
wherein a layer of an adhesive composition is disposed proximate the film and the adhesive composition has a tensile elastic modulus of less than 1 MPa at 25° C. and 1 hertz.

2. The film of claim 1 wherein the adhesive composition has a Tg of less than 25° C.

3. The film of claim 1 wherein the adhesive composition is a pressure sensitive adhesive having a tensile elastic modulus of less than 0.9 MPa at 25° C. and 1 hertz.

4. The film of claim 1 wherein the film is a backing of an adhesive coated sheet or tape.

5. The film of claim 1 wherein the film further comprises a second backing proximate the base film.

6. The film of claim 5 wherein the second backing comprises a substrate selected from polymeric films, woven or nonwoven fabrics, metal foils, foams, paper, and combinations thereof.

7. The film of claim 1 wherein the film and/or second backing is a conformable polymeric film.

8. The film of claim 1 wherein the adhesive composition is an acrylic adhesive composition.

9. The film of claim 1 wherein the layer of adhesive is structured.

10. The film of claim 1 wherein the film comprises a structured layer.

11. The film of claim 1 further comprising a release coating disposed on an outer exposed surface of the film.

12. The film of claim 1 further comprising a removable release liner covering the layer of adhesive.

13. The film of claim 1 wherein the film has a Tg of at least 30° C.

14. The film of claim 1 wherein the film has a gel content of at least 20%.

15. The film of claim 1 wherein the film has a tensile elastic modulus of at least 1 MPa at 25° C. and 1 hertz.

16. The film of claim 1 wherein the film comprises at least 10 wt.-% of polymerized units of monofunctional alkyl (meth)acrylate monomer having a Tg of less than 0° C.

17. The film of claim 16 wherein the film comprises polymerized units of monofunctional alkyl (meth)acrylate monomer having a Tg of less than −40° C.

18. The film of claim 1 wherein the film comprises at least 10 wt.-% and no greater than 65 wt.-% of polymerized units of polar monomers selected from acid-functional, hydroxyl functional monomers, nitrogen-containing monomers, and combinations thereof.

19. The film of claim 1 wherein the film further comprises polymerized units of a multifunctional crosslinker wherein the crosslinker comprises functional groups selected from (meth)acrylate, alkenyl, and hydroxyl-reactive groups.

20. The film of claim 1 wherein the (meth)acrylic polymer and polyvinyl acetal polymer composition of the film has a single phase.

21. The film of claim 2 wherein the adhesive composition has a Tg of less than 0° C.

* * * * *

UNITED STATES PATENT AND TRADEMARK OFFICE
CERTIFICATE OF CORRECTION

PATENT NO. : 10,344,188 B2
APPLICATION NO. : 15/777947
DATED : July 9, 2019
INVENTOR(S) : Jonathan Janoski et al.

Page 1 of 1

It is certified that error appears in the above-identified patent and that said Letters Patent is hereby corrected as shown below:

In the Specification

Column 2,
Line 35, delete "polystyren," and insert -- polystyrene, --, therefor.

Column 5,
Lines 52 & 53, after "reference" insert -- . --.

Column 9,
Line 13, delete "R₂" and insert -- $R^2$ --, therefor.
Line 15, delete "R₂" and insert -- $R^2$ --, therefor.

Column 12,
Line 23, delete "calorimetry," and insert -- Calorimetry, --, therefor.

Column 13,
Line 9, delete "or or" and insert -- or --, therefor.

Columns 15 & 16,
Line 53, delete "diacyrylate," and insert -- diacrylate, --, therefor.
Line 59, delete "-tert•butyl-" and insert -- -tert.butyl- --, therefor.

Column 28,
Line 63, delete "¼′″" and insert -- ½″ --, therefor.

Signed and Sealed this
Seventeenth Day of September, 2019

Andrei Iancu
*Director of the United States Patent and Trademark Office*